(12) United States Patent
Loveday et al.

(10) Patent No.: US 6,894,128 B2
(45) Date of Patent: May 17, 2005

(54) CATALYST COMPOSITION, METHOD OF POLYMERIZATION, AND POLYMER THEREFROM

(75) Inventors: Donald R. Loveday, Houston, TX (US); David H. McConville, Houston, TX (US); John F. Szul, Nitro, WV (US); Kersten Anne Erickson, South Charleston, WV (US); Simon Mawson, Charleston, WV (US); Tae Hoon Kwack, Belle Mead, NJ (US); Frederick J. Karol, Belle Mead, NJ (US); David James Schreck, Cross Lanes, WV (US)

(73) Assignee: Univation Technologies, LLC, Houston, TX (US)

( * ) Notice: Subject to any disclaimer, the term of this patent is extended or adjusted under 35 U.S.C. 154(b) by 45 days.

(21) Appl. No.: 10/634,474

(22) Filed: Aug. 5, 2003

(65) Prior Publication Data

US 2004/0030070 A1 Feb. 12, 2004

Related U.S. Application Data

(60) Continuation of application No. 09/865,067, filed on May 24, 2001, now abandoned, which is a division of application No. 09/425,387, filed on Oct. 22, 1999, now Pat. No. 6,274,684.

(51) Int. Cl.$^7$ .............. C08F 4/06; C08F 4/72; C08F 4/44; C08F 4/80; C08F 4/68
(52) U.S. Cl. ............... 526/113; 526/114; 526/116; 526/117; 526/118; 526/119; 526/161; 526/171; 526/943
(58) Field of Search ................... 526/161, 171, 526/943, 113, 114, 116, 117, 118, 119

(56) References Cited

U.S. PATENT DOCUMENTS

| | | | |
|---|---|---|---|
| 4,057,565 A | 11/1977 | Manzer | 260/429 |
| 5,318,935 A | 6/1994 | Canich et al. | 502/117 |
| 5,426,243 A | 6/1995 | Lecouve | 568/737 |
| 5,506,184 A | 4/1996 | Kissin et al. | 502/115 |
| 5,539,076 A | 7/1996 | Nowlin et al. | 526/348 |
| 5,608,019 A | 3/1997 | Cheruvu et al. | 526/129 |
| 5,614,456 A | 3/1997 | Mink et al. | 502/115 |
| 5,622,906 A | 4/1997 | Pettijohn | 502/104 |
| 5,637,660 A | 6/1997 | Nagy et al. | 526/160 |
| 5,643,846 A | 7/1997 | Reddy et al. | 502/104 |
| 5,672,669 A | 9/1997 | Wasserman et al. | 526/170 |
| 5,674,796 A | 10/1997 | Lee et al. | 502/22 |
| 5,707,913 A | 1/1998 | Schlund et al. | 502/102 |
| 5,726,115 A | 3/1998 | Horton et al. | 502/152 |
| 5,798,427 A | 8/1998 | Foster et al. | 526/352 |
| 5,889,128 A | 3/1999 | Schrock et al. | 526/107 |
| 5,955,555 A | 9/1999 | Bennett | 526/133 |
| 6,265,505 B1 | 7/2001 | McConville et al. | 526/161 |

(Continued)

FOREIGN PATENT DOCUMENTS

| | | |
|---|---|---|
| EP | 0197310 A3 | 10/1986 |
| EP | 0197310 A2 | 10/1986 |

(Continued)

OTHER PUBLICATIONS

*Organometallics*, Bei et al., vol. 16, pp. 3282–3302 (1997).
*Organometallics*, Grubbs, vol. 17, pp. 3149–3151 (1998).

(Continued)

*Primary Examiner*—Mark L. Bell
*Assistant Examiner*—J. Pasterczyk
(74) *Attorney, Agent, or Firm*—Kevin M. Faulkner

(57) ABSTRACT

Catalyst compositions and methods useful in polymerization processes utilizing at least two metal compounds are disclosed. At least one of the metal compounds is a Group 15 containing metal compound and the other metal compound is preferably a bulky ligand metallocene-type catalyst. The invention also discloses a new polyolefin, generally polyethylene, particularly a multimodal polymer and more specifically, a bimodal polymer, and its use in various end-use applications such as film, molding and pipe. The Group 15 containing metal compound is represented in one embodiment by the formulae:

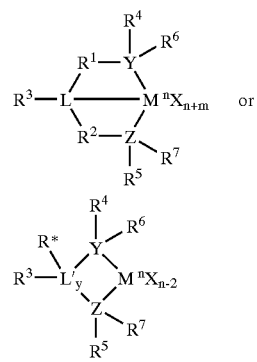

wherein M is a Group 4, 5, or 6 metal;
each X is independently a leaving group;
y is 0 or 1;
n is the oxidation state of M;
m is the formal change of the ligand comprising the YZL or YZL' groups;
L is a Group 15 or 16 element;
L' is a Group 15 or 16 element or Group 14 containing group;
Y is a Group 15 element;
Z is a Group 15 element;
and the other groups are as defined herein.

18 Claims, No Drawings

U.S. PATENT DOCUMENTS

| | | |
|---|---|---|
| 6,271,323 B1 | 8/2001 | Loveday et al. ............ 526/161 |
| 6,271,325 B1 | 8/2001 | McConville et al. ....... 526/217 |
| 6,274,684 B1 | 8/2001 | Loveday et al. ............ 526/114 |
| 6,300,438 B1 | 10/2001 | McConville ................ 526/161 |
| 6,300,439 B1 | 10/2001 | McConville ................ 526/161 |
| 6,333,389 B2 | 12/2001 | Whiteker et al. ........... 526/161 |
| 6,380,328 B1 | 4/2002 | McConville et al. ....... 526/119 |
| 6,399,722 B1 | 6/2002 | Szul et al. .................. 526/113 |
| 6,403,181 B1 | 6/2002 | Barry et al. ............... 428/36.9 |
| 6,410,474 B1 | 6/2002 | Nowlin et al. ............. 502/113 |
| 6,417,304 B1 | 7/2002 | McConville et al. ....... 526/161 |
| 6,656,866 B2 * | 12/2003 | Wenzel et al. .............. 502/117 |
| 6,689,847 B2 * | 2/2004 | Mawson et al. ............ 526/116 |
| 6,696,537 B2 * | 2/2004 | McConville et al. ....... 526/352 |
| 6,703,338 B2 * | 3/2004 | Holtcamp et al. .......... 502/123 |
| 6,723,808 B2 * | 4/2004 | Holtcamp ................ 526/124.1 |
| 2001/0029232 A1 | 10/2001 | Eisen et al. ................. 502/103 |
| 2001/0031695 A1 | 10/2001 | Loveday et al. ............ 502/117 |
| 2002/0103071 A1 | 8/2002 | Oskam ....................... 502/103 |
| 2002/0107137 A1 | 8/2002 | Peterson et al. ............ 502/103 |
| 2002/0111443 A1 | 8/2002 | Szul et al. .................. 502/113 |
| 2002/0119890 A1 | 8/2002 | Wenzel et al. .............. 502/103 |

FOREIGN PATENT DOCUMENTS

| | | |
|---|---|---|
| EP | 0241560 A1 | 10/1987 |
| EP | 0751142 A2 | 1/1997 |
| EP | 0816372 A2 | 1/1998 |
| EP | 0816384 A2 | 1/1998 |
| EP | 0816384 A3 | 1/1998 |
| EP | 0668295 | 6/1998 |
| EP | 0874005 A1 | 10/1998 |
| EP | 0803520 B1 | 12/1998 |
| EP | 0890575 A1 | 1/1999 |
| EP | 0893454 A1 | 1/1999 |
| JP | 02-78663 | 3/1990 |
| JP | 08-081415 | 7/1996 |
| JP | 08-277307 | 10/1996 |
| JP | 10-7712 | 1/1998 |
| JP | 10-45904 | 2/1998 |
| JP | 10-330412 | 12/1998 |
| JP | 10-330416 | 12/1998 |
| WO | WO 91/12285 | 8/1991 |
| WO | WO 92/12162 | 7/1992 |
| WO | WO 94/21700 | 9/1994 |
| WO | WO 96/08498 | 3/1996 |
| WO | WO 97/02294 | 1/1997 |
| WO | WO 97/42197 | 11/1997 |
| WO | WO 97/45434 | 12/1997 |
| WO | WO 97/48735 | 12/1997 |
| WO | WO 97/48736 | 12/1997 |
| WO | WO 98/27124 | 6/1998 |
| WO | WO 98/30569 | 7/1998 |
| WO | WO 98/30612 | 7/1998 |
| WO | WO 98/34964 | 8/1998 |
| WO | WO 98/37106 | 8/1998 |
| WO | WO 98/37109 | 8/1998 |
| WO | WO 98/46651 | 10/1998 |
| WO | WO 98/55467 | 12/1998 |
| WO | WO 99/01460 | 1/1999 |
| WO | WO 99/02472 | 1/1999 |
| WO | WO 99/02536 | 1/1999 |
| WO | WO 99/12981 | 3/1999 |
| WO | WO 99/46303 | 9/1999 |
| WO | WO 99/46304 | 9/1999 |

OTHER PUBLICATIONS

*Macromolecules*, Repo, vol. 30, pp. 171–175 (1997).
*Polyhedron*, Guerin et al., vol. 17 (5–6), pp. 917–923 (1998).
*Inorganic Chemistry*, Furhman/Kempe et al., vol. 35, pp. 6742–6745 (1996).
*Organometallics*, Guerin et al., vol. 15 (26), pp. 5586–5590 (1996).
*Organometallics*, Guerin et al., vol. 17 (23), pp. 5172–5177 (1998).
*Macromolecular Chemistry and Physics*, Silvestro et al., vol. 197, No. 10, pp. 3209–3228 (1996).
*Journal of Organometallic Chemistry*, Harkonen et al., vol. 519, No. 1, pp. 205–208 (1996).
*J. Chem. Soc. Dalton Trans.*, Cloke et al., pp. 25–30 (1995).
*Journal of Organometallic Chemistry*, Clark et al., vol. 501, pp. 333–340 (1995).
*J. Am. Chem. Soc.*, Baumann et al., vol. 119, pp. 3830–3831 (1997).
*J. Am. Chem. Soc.*, Scollard et al., vol. 118, pp. 10008–10009 (1996).
*Organometallics*, Horton et al., vol. 15, pp. 2672–2674 (1996).
*Organometallics*, Guerin et al., vol. 15, pp. 5085–5089 (1996).
*J. Am. Chem. Soc.*, L. Liang et al., vol. 121, No. 24, pp. 5797–5798 (1999).
Eskelinen, Mari, et al., "*Effect of Polymerization Temperature on the Polymerization of Ethylene with Dicyclopentadienylzirconiumdichloride/Methylalumoxane Catalyst*" Eur. Polym. J. vol. 32 No. 3 pp. 331–335 (1996).
Kang, Kap Ku, et al. "*The Synthesis and Polymerization Behaviro of Bimetallic Pyrideine Diaminde Completxes Containing Transtion Metal (Ti, Zr )*"Journal of Polymer Science: Part A: Polymer Chemistry, vol. 37, pp. 3756–3762 (1999).

\* cited by examiner

CATALYST COMPOSITION, METHOD OF POLYMERIZATION, AND POLYMER THEREFROM

STATEMENT OF RELATED APPLICATIONS

The present application is a Continuation Application of U.S. Ser. No. 09/865,067 filed May 24, 2001, now abandoned, which is a Divisional Application of, and claims priority to U.S. Ser. No. 09/425,387 filed Oct. 22, 1999, now issued as U.S. Pat. No. 6,274,684.

FIELD OF THE INVENTION

The present invention relates to a catalyst composition comprising at least two metal compounds useful in olefin polymerization processes to produce polyolefins. Preferably, at least one of the metal compounds is a Group 15 containing metal compound. More preferably, the other metal compound is a bulky ligand metallocene-type catalyst. The present invention also relates to a new polyolefin, generally polyethylene, particularly a multimodal polymer and more specifically, a bimodal polymer, and its use in various end-use applications such as film, molding and pipe.

BACKGROUND OF THE INVENTION

Polyethylenes with a higher density and higher molecular weight are valued in film applications requiring high stiffness, good toughness and high throughput. Such resins are also valued in pipe applications requiring stiffness, toughness and long-term durability, and particularly resistance to environmental stress cracking.

Typical metallocene polymerization catalysts (i.e. those containing a transition metal bound, for example, to at least one cyclopentadienyl, indenyl or fluorenyl group) have recently been used to produce resins having desirable product properties. While these resins have excellent toughness properties, particularly dart impact properties, they, like other metallocene catalyzed polyethylenes, can be difficult to process, for example, on older extrusion equipment. One of the means used to improve the processing of such metallocene catalyzed polyethylenes is to blend them with another polyethylene. While the two polymer blend tends to be more processable, it is expensive and adds a cumbersome blending step to the manufacturing/fabrication process.

Higher molecular weight confers desirable mechanical properties and stable bubble formation onto polyethylene polymers. However, it also inhibits extrusion processing by increasing backpressure in extruders, promotes melt fracture defects in the inflating bubble and potentially, promotes too high a degree of orientation in the finished film. To remedy this, one may form a secondary, minor component of lower molecular weight polymer to reduce extruder backpressure and inhibit melt fracture. Several industrial processes operate on this principle using multiple reactor technology to produce a processable bimodal molecular weight distribution (MWD) high density polyethylene (HDPE) product. HIZEX™, a Mitsui Chemicals HDPE product, is considered the worldwide standard. HIZEX™ is produced in two or more reactors and is costly to produce. In a multiple reactor process, each reactor produces a single component of the final product.

Others in the art have tried to produce two polymers together at the same time in the same reactor using two different catalysts. PCT patent application WO 99/03899 discloses using a typical metallocene catalyst and a conventional Ziegler-Natta catalyst in the same reactor to produce a bimodal MWD HDPE. Using two different types of catalysts, however, result in a polymer whose characteristics cannot be predicted from those of the polymers that each catalyst would produce if utilized separately. This unpredictability occurs, for example, from competition or other influence between the catalyst or catalyst systems used. These polymers however still do not have a preferred balance of processability and strength properties. Thus, there is a desire for a combination of catalysts capable of producing processable polyethylene polymers in preferably a single reactor having desirable combinations of processing, mechanical and optical properties.

SUMMARY OF THE INVENTION

The present invention provides a catalyst composition, a polymerization process using the catalyst composition, polymer produced therefrom and products made from the polymer.

In one embodiment, the invention is directed to a catalyst composition including at least two metal compounds, where at least one metal compound is a Group 15 containing metal compound, and where the other metal compound is a bulky ligand metallocene-type compound, a conventional transition metal catalyst, or combinations thereof.

In one embodiment, the invention is directed to a catalyst composition including at least two metal compounds, where at least one metal compound is a Group 15 containing bidentate or tridentate ligated Group 3 to 14 metal compound, preferably a Group 3 to 7, more preferably a Group 4 to 6, and even more preferably a Group 4 metal compound, and where the other metal compound is a bulky ligand metallocene-type compound, a conventional transition metal catalyst, or combinations thereof. In this embodiment it is preferred that the other metal compound is a bulky ligand metallocene-type compound.

In another embodiment, the invention is directed to a catalyst composition including at least two metal compounds, where one metal compound is a Group 3 to 14 metal atom bound to at least one leaving group and also bound to at least two Group 15 atoms, at least one of which is also bound to a Group 15 or 16 atom through another group, and where the second metal compound, is different from the first metal compound, and is a bulky ligand metallocene-type catalyst, a conventional-type transition metal catalyst, or combinations thereof.

In an embodiment, the invention is directed to processes for polymerizing olefin(s) utilizing the above catalyst compositions, especially in a single polymerization reactor.

In yet another embodiment, the invention is directed to the polymers prepared utilizing the above catalyst composition, preferably to a new bimodal MWD HDPE.

DETAILED DESCRIPTION OF THE INVENTION

Introduction

The present invention relates to the use of a mixed catalyst composition where one of the catalysts is a Group 15 containing metal compound. Applicants have discovered that using these compounds in combination with another catalyst, preferably a bulky ligand metallocene type compound, produces a new bimodal MWD HDPE product. Surprisingly, the mixed catalyst composition of the present invention may be utilized in a single reactor system.

Group 15 Containing Metal Compound

The mixed catalyst composition of the present invention includes a Group 15 containing metal compound. The Group 15 containing compound generally includes a Group 3 to 14 metal atom, preferably a Group 3 to 7, more preferably a Group 4 to 6, and even more preferably a Group 4 metal atom, bound to at least one leaving group and also bound to at least two Group 15 atoms, at least one of which is also bound to a Group 15 or 16 atom through another group.

In one preferred embodiment, at least one of the Group 15 atoms is also bound to a Group 15 or 16 atom through another group which may be a $C_1$ to $C_{20}$ hydrocarbon group, a heteroatom containing group, silicon, germanium, tin, lead, or phosphorus, wherein the Group 15 or 16 atom may also be bound to nothing or a hydrogen, a Group 14 atom containing group, a halogen, or a heteroatom containing group, and wherein each of the two Group 15 atoms are also bound to a cyclic group and may optionally be bound to hydrogen, a halogen, a heteroatom or a hydrocarbyl group, or a heteroatom containing group.

In a preferred embodiment, the Group 15 containing metal compound of the present invention may be represented by the formulae:

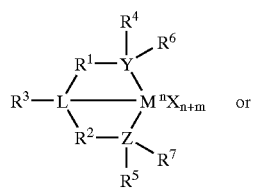

Formula I or

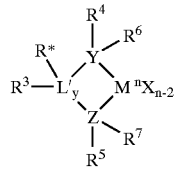

Formula II wherein

M is a Group 3 to 12 transition metal or a Group 13 or 14 main group metal, preferably a Group 4, 5, or 6 metal, and more preferably a Group 4 metal, and most preferably zirconium, titanium or hafnium, each X is independently a leaving group, preferably, an anionic leaving group, and more preferably hydrogen, a hydrocarbyl group, a heteroatom or a halogen, and most preferably an alkyl.

y is 0 or 1 (when y is 0 group L' is absent), n is the oxidation state of M, preferably +3, +4, or +5, and more preferably +4, m is the formal charge of the YZL or the YZL' ligand, preferably 0, -1, -2 or -3, and more preferably -2, L is a Group 15 or 16 element, preferably nitrogen, L' is a Group 15 or 16 element or Group 14 containing group, preferably carbon, silicon or germanium, Y is a Group 15 element, preferably nitrogen or phosphorus, and more preferably nitrogen, Z is a Group 15 element, preferably nitrogen or phosphorus, and more preferably nitrogen, $R^1$ and $R^2$ are independently a $C_1$ to $C_{20}$ hydrocarbon group, a heteroatom containing group having up to twenty carbon atoms, silicon, germanium, tin, lead, or phosphorus, preferably a $C_2$ to $C_{20}$ alkyl, aryl or aralkyl group, more preferably a linear, branched or cyclic $C_2$ to $C_{20}$ alkyl group, most preferably a $C_2$ to $C_6$ hydrocarbon group.

$R^3$ is absent or a hydrocarbon group, hydrogen, a halogen, a heteroatom containing group, preferably a linear, cyclic or branched alkyl group having 1 to 20 carbon atoms, more preferably $R^3$ is absent, hydrogen or an alkyl group, and most preferably hydrogen $R^4$ and $R^5$ are independently an alkyl group, an aryl group, substituted aryl group, a cyclic alkyl group, a substituted cyclic alkyl group, a cyclic aralkyl group, a substituted cyclic aralkyl group or multiple ring system, preferably having up to 20 carbon atoms, more preferably between 3 and 10 carbon atoms, and even more preferably a $C_1$ to $C_{20}$ hydrocarbon group, a $C_1$ to $C_{20}$ aryl group or a $C_1$ to $C_{20}$ aralkyl group, or a heteroatom containing group, for example $PR_3$, where R is an alkyl group, $R^1$ and $R^2$ may be interconnected to each other, and/or $R^4$ and $R^5$ may be interconnected to each other, $R^6$ and $R^7$ are independently absent, or hydrogen, an alkyl group, halogen, heteroatom or a hydrocarbyl group, preferably a linear, cyclic or branched alkyl group having 1 to 20 carbon atoms, more preferably absent, and $R^*$ is absent, or is hydrogen, a Group 14 atom containing group, a halogen, a heteroatom containing group.

By "formal charge of the YZL or YZL' ligand", it is meant the charge of the entire ligand absent the metal and the leaving groups X.

By "$R^1$ and $R^2$ may also be interconnected" it is meant that $R^1$ and $R^2$ may be directly bound to each other or may be bound to each other through other groups. By "$R^4$ and $R^5$ may also be interconnected" it is meant that $R^4$ and $R^5$ may be directly bound to each other or may be bound to each other through other groups.

An alkyl group may be a linear, branched alkyl radicals, or alkenyl radicals, alkynyl radicals, cycloalkyl radicals or aryl radicals, acyl radicals, aroyl radicals, alkoxy radicals, aryloxy radicals, alkylthio radicals, dialkylamino radicals, alkoxycarbonyl radicals, aryloxycarbonyl radicals, carbomoyl radicals, alkyl- or dialkyl-carbamoyl radicals, acyloxy radicals, acylamino radicals, aroylamino radicals, straight, branched or cyclic, alkylene radicals, or combination thereof. An aralkyl group is defined to be a substituted aryl group.

In a preferred embodiment $R^4$ and $R^5$ are independently a group represented by the following formula:

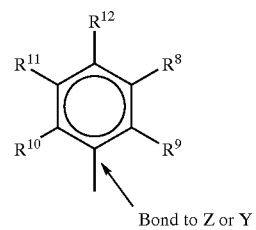

Formula 1

Bond to Z or Y wherein $R^8$ to $R^{12}$ are each independently hydrogen, a $C_1$ to $C_{40}$ alkyl group, a halide, a heteroatom, a heteroatom containing group containing up to 40 carbon atoms, preferably a $C_1$ to $C_{20}$ linear or branched alkyl group, preferably a methyl, ethyl, propyl or butyl group, any two R groups may form a cyclic group and/or a heterocyclic group. The cyclic groups may be aromatic. In a preferred embodiment $R^9$, $R^{10}$ and $R^{12}$ are independently a methyl, ethyl, propyl or butyl group (including all isomers), in a preferred embodiment $R^9$, $R^{10}$ and $R^{12}$ are methyl groups, and $R^8$ and $R^{11}$ are hydrogen.

In a particularly preferred embodiment $R^4$ and $R^5$ are both a group represented by the following formula:

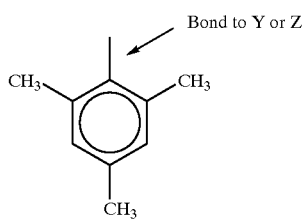

Formula 2

In this embodiment, M is a Group 4 metal, preferably zirconium, titanium or hafnium, and even more preferably zirconium; each of L, Y, and Z is nitrogen; each of $R^1$ and $R^2$ is —CH$_2$—CH$_2$—; $R^3$ is hydrogen; and $R^6$ and $R^7$ are absent.

In a particularly preferred embodiment the Group 15 containing metal compound is represented by the formula:

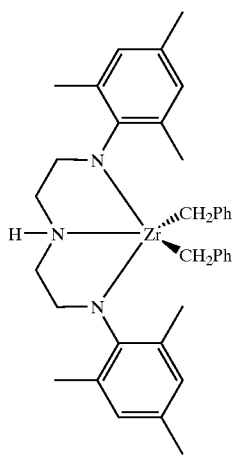

Compound I

In compound I, Ph equals phenyl.

Group 15 containing metal compounds of the invention are prepared by methods known in the art, such as those disclosed in EP 0 893 454 A1, U.S. Pat. No. 5,889,128 and the references cited in U.S. Pat. No. 5,889,128 which are all herein incorporated by reference. U.S. Pat. No. 6,271,325 discloses a gas or slurry phase polymerization process using a supported bisamide catalyst, which is also incorporated herein by reference.

A preferred direct synthesis of these compounds comprises reacting the neutral ligand, (see for example YZL or YZL' of formula 1 or 2) with M"X$_n$ (M is a Group 3 to 14 metal, n is the oxidation state of M, each X is an anionic group, such as halide, in a non-coordinating or weakly coordinating solvent, such as ether, toluene, xylene, benzene, methylene chloride, and/or hexane or other solvent having a boiling point above 60° C., at about 20 to about 150° C. (preferably 20 to 100° C.), preferably for 24 hours or more, then treating the mixture with an excess (such as four or more equivalents) of an alkylating agent, such as methyl magnesium bromide in ether. The magnesium salts are removed by filtration, and the metal complex isolated by standard techniques.

In one embodiment the Group 15 containing metal compound is prepared by a method comprising reacting a neutral ligand, (see for example YZL or YZL' of formula 1 or 2) with a compound represented by the formula M"X$_n$ (where M is a Group 3 to 14 metal, n is the oxidation state of M, each X is an anionic leaving group) in a non-coordinating or weakly coordinating solvent, at about 20° C. or above, preferably at about 20 to about 100° C., then treating the mixture with an excess of an alkylating agent, then recovering the metal complex. In a preferred embodiment the solvent has a boiling point above 60° C., such as toluene, xylene, benzene, and/or hexane. In another embodiment the solvent comprises ether and/or methylene chloride, either being preferable.

Bulky Ligand Metallocene-Type Compound

In addition to the Group 15 containing metal compound, the mixed catalyst composition of the present invention also includes a second metal compound, which is preferably a bulky ligand metallocene-type compound.

Generally, bulky ligand metallocene-type compounds include half and full sandwich compounds having one or more bulky ligands bonded to at least one metal atom. Typical bulky ligand metallocene-type compounds are generally described as containing one or more bulky ligand(s) and one or more leaving group(s) bonded to at least one metal atom. In one preferred embodiment, at least one bulky ligands is η-bonded to the metal atom, most preferably η$^5$-bonded to the metal atom.

The bulky ligands are generally represented by one or more open, acyclic, or fused ring(s) or ring system(s) or a combination thereof. These bulky ligands, preferably the ring(s) or ring system(s) are typically composed of atoms selected from Groups 13 to 16 atoms of the Periodic Table of Elements, preferably the atoms are selected from the group consisting of carbon, nitrogen, oxygen, silicon, sulfur, phosphorous, germanium, boron and aluminum or a combination thereof. Most preferably the ring(s) or ring system (s) are composed of carbon atoms such as but not limited to those cyclopentadienyl ligands or cyclopentadienyl-type ligand structures or other similar functioning ligand structure such as a pentadiene, a cyclooctatetraendiyl or an imide ligand. The metal atom is preferably selected from Groups 3 through 15 and the lanthanide or actinide series of the Periodic Table of Elements. Preferably the metal is a transition metal from Groups 4 through 12, more preferably Groups 4, 5 and 6, and most preferably the transition metal is from Group 4.

In one embodiment, the bulky ligand metallocene-type catalyst compounds are represented by the formula:

$$L^A L^B M Q_n \qquad (III)$$

where M is a metal atom from the Periodic Table of the Elements and may be a Group 3 to 12 metal or from the lanthanide or actinide series of the Periodic Table of Elements, preferably M is a Group 4, 5 or 6 transition metal, more preferably M is a Group 4 transition metal, even more preferably M is zirconium, hafnium or titanium. The bulky ligands, $L^A$ and $L^B$, are open, acyclic or fused ring(s) or ring system(s) and are any ancillary ligand system, including unsubstituted or substituted, cyclopentadienyl ligands or cyclopentadienyl-type ligands, heteroatom substituted and/ or heteroatom containing cyclopentadienyl-type ligands. Non-limiting examples of bulky ligands include cyclopentadienyl ligands, cyclopentaphenanthreneyl ligands, indenyl ligands, benzindenyl ligands, fluorenyl ligands, octahydrofluorenyl ligands, cyclooctatetraendiyl ligands, cyclopentacyclododecene ligands, azenyl ligands, azulene ligands, pentalene ligands, phosphoyl ligands, phosphinimine (WO 99/40125), pyrrolyl ligands, pyrozolyl ligands, carbazolyl ligands, borabenzene ligands and the like, including hydrogenated versions thereof, for example tetrahydroindenyl ligands. In one embodiment, $L^A$ and $L^B$ may be any other ligand structure capable of η-bonding to M, preferably $η^3$-bonding to M and most preferably $η^5$-bonding. In yet another embodiment, the atomic molecular weight (MW) of $L^A$ or $L^B$ exceeds 60 a.m.u., preferably greater than 65 a.m.u. In another embodiment, $L^A$ and $L^B$ may comprise one or more heteroatoms, for example, nitrogen, silicon, boron, germanium, sulfur and phosphorous, in combination with carbon atoms to form an open, acyclic, or preferably a fused, ring or ring system, for example, a heterocyclopentadienyl ancillary ligand. Other $L^A$ and $L^B$ bulky ligands include but are not limited to bulky amides, phosphides, alkoxides, aryloxides, imides, carbolides, borollides, porphyrins, phthalocyanines, corrins and other polyazomacrocycles. Independently, each $L^A$ and $L^B$ may be the same or different type of bulky ligand that is bonded to M. In one embodiment of formula (III) only one of either $L^A$ or $L^B$ is present.

Independently, each $L^A$ and $L^B$ may be unsubstituted or substituted with a combination of substituent groups R. Non-limiting examples of substituent groups R include one or more from the group selected from hydrogen, or linear, branched alkyl radicals, or alkenyl radicals, alkynyl radicals, cycloalkyl radicals or aryl radicals, acyl radicals, aroyl radicals, alkoxy radicals, aryloxy radicals, alkylthio radicals, dialkylamino radicals, alkoxycarbonyl radicals, aryloxycarbonyl radicals, carbomoyl radicals, alkyl- or dialkyl- carbamoyl radicals, acyloxy radicals, acylamino radicals, aroylamino radicals, straight, branched or cyclic, alkylene radicals, or combination thereof. In a preferred embodiment, substituent groups R have up to 50 non-hydrogen atoms, preferably from 1 to 30 carbon, that can also be substituted with halogens or heteroatoms or the like. Non-limiting examples of alkyl substituents R include methyl, ethyl, propyl, butyl, pentyl, hexyl, cyclopentyl, cyclohexyl, benzyl or phenyl groups and the like, including all their isomers, for example tertiary butyl, isopropyl, and the like. Other hydrocarbyl radicals include fluoromethyl, fluroethyl, difluroethyl, iodopropyl, bromohexyl, chlorobenzyl and hydrocarbyl substituted organometalloid radicals including trimethylsilyl, trimethylgermyl, methyldiethylsilyl and the like; and halocarbyl-substituted organometalloid radicals including tris(trifluoromethyl)-silyl, methylbis (difluoromethyl)silyl, bromomethyldimethylgermyl and the like; and disubstitiuted boron radicals including dimethylboron for example; and disubstituted pnictogen radicals including dimethylamine, dimethylphosphine, diphenylamine, methylphenylphosphine, chalcogen radicals including methoxy, ethoxy, propoxy, phenoxy, methylsulfide and ethylsulfide. Non-hydrogen substituents R include the atoms carbon, silicon, boron, aluminum, nitrogen, phosphorous, oxygen, tin, sulfur, germanium and the like, including olefins such as but not limited to olefinically unsaturated substituents including vinyl-terminated ligands, for example but-3-enyl, prop-2-enyl, hex-5-enyl and the like. Also, at least two R groups, preferably two adjacent R groups, are joined to form a ring structure having from 3 to 30 atoms selected from carbon, nitrogen, oxygen, phosphorous, silicon, germanium, aluminum, boron or a combination thereof. Also, a substituent group R group such as 1-butanyl may form a carbon sigma bond to the metal M.

Other ligands may be bonded to the metal M, such as at least one leaving group Q. In one embodiment, Q is a monoanionic labile ligand having a sigma-bond to M. Depending on the oxidation state of the metal, the value for n is 0, 1 or 2 such that formula (III) above represents a neutral bulky ligand metallocene-type catalyst compound.

Non-limiting examples of Q ligands include weak bases such as amines, phosphines, ethers, carboxylates, dienes, hydrocarbyl radicals having from 1 to 20 carbon atoms, hydrides or halogens and the like or a combination thereof. In another embodiment, two or more Q's form a part of a fused ring or ring system. Other examples of Q ligands include those substituents for R as described above and including cyclobutyl, cyclohexyl, heptyl, tolyl, trifluromethyl, tetramethylene, pentamethylene, methylidene, methyoxy, ethyoxy, propoxy, phenoxy, bis(N-methylanilide), dimethylamide, dimethylphosphide radicals and the like.

In one embodiment, the bulky ligand metallocene-type catalyst compounds of the invention include those of formula (III) where $L^A$ and $L^B$ are bridged to each other by at least one bridging group, A, such that the formula is represented by $$L^A A L^B M Q_n \qquad (IV)$$

These bridged compounds represented by formula (IV) are known as bridged, bulky ligand metallocene-type catalyst compounds. $L^A$, $L^B$, M, Q and n are as defined above. Non-limiting examples of bridging group A include bridging groups containing at least one Group 13 to 16 atom, often referred to as a divalent moiety such as but not limited to at least one of a carbon, oxygen, nitrogen, silicon, aluminum, boron, germanium and tin atom or a combination thereof. Preferably bridging group A contains a carbon, silicon or germanium atom, most preferably A contains at least one silicon atom or at least one carbon atom. The bridging group A may also contain substituent groups R as defined above including halogens and iron. Non-limiting examples of bridging group A may be represented by $R'_2C$, $R'_2Si$, $R'_2Si$, $R'_2Ge$, R'P, where R' is independently, a radical group which is hydride, hydrocarbyl, substituted hydrocarbyl, halocarbyl, substituted halocarbyl, hydrocarbyl-substituted organometalloid, halocarbyl-substituted organometalloid, disubstituted boron, disubstituted pnictogen, substituted chalcogen, or halogen or two or more R' may be joined to form a ring or ring system. In one embodiment, the bridged, bulky ligand metallocene-type catalyst compounds of formula (IV) have two or more bridging groups A (EP 664 301 B1).

In one embodiment, the bulky ligand metallocene-type catalyst compounds are those where the R substituents on the bulky ligands $L^A$ and $L^B$ of formulas (III) and (IV) are substituted with the same or different number of substituents on each of the bulky ligands. In another embodiment, the bulky ligands $L^A$ and $L^B$ of formulas (III) and (IV) are different from each other.

Other bulky ligand metallocene-type catalyst compounds and catalyst systems useful in the invention may include those described in U.S. Pat. Nos. 5,064,802, 5,145,819, 5,149,819, 5,243,001, 5,239,022, 5,276,208, 5,296,434, 5,321,106, 5,329,031, 5,304,614, 5,677,401, 5,723,398, 5,753,578, 5,854,363, 5,856,547 5,858,903, 5,859,158, 5,900,517 and 5,939,503 and PCT publications WO 93/08221, WO 93/08199, WO 95/07140, WO 98/11144, WO 98/41530, WO 98/41529, WO 98/46650, WO 99/02540 and WO 99/14221 and European publications EP-A-0 578 838, EP-A-0 638 595, EP-B-0 513 380, EP-A1-0 816 372, EP-A2-0 839 834, EP-B1-0 632 819, EP-B1-0 748 821 and EP-B1-0 757 996, all of which are herein fully incorporated by reference.

In one embodiment, bulky ligand metallocene-type catalysts compounds useful in the invention include bridged heteroatom, mono-bulky ligand metallocene-type compounds. These types of catalysts and catalyst systems are described in, for example, PCT publication WO 92/00333, WO 94/07928, WO 91/04257, WO 94/03506, WO96/00244, WO 97/15602 and WO 99/20637 and U.S. Pat. Nos. 5,057, 475, 5,096,867, 5,055,438, 5,198,401, 5,227,440 and 5,264, 405 and European publication EP-A-0 420 436, all of which are herein fully incorporated by reference.

In this embodiment, the bulky ligand metallocene-type catalyst compound is represented by the formula:

$$L^C AJMQ_n \qquad (V)$$

where M is a Group 3 to 16 metal atom or a metal selected from the Group of actinides and lanthanides of the Periodic Table of Elements, preferably M is a Group 4 to 12 transition metal, and more preferably M is a Group 4, 5 or 6 transition metal, and most preferably M is a Group 4 transition metal in any oxidation state, especially titanium; $L^C$ is a substituted or unsubstituted bulky ligand bonded to M; J is bonded to M; A is bonded to M and J; J is a heteroatom ancillary ligand; and A is a bridging group; Q is a univalent anionic ligand; and n is the integer 0, 1 or 2. In formula (V) above, $L^C$, A and J form a fused ring system. In an embodiment, $L^C$ of formula (V) is as defined above for $L^A$, A, M and Q of formula (V) are as defined above in formula (III).

In formula (V) J is a heteroatom containing ligand in which J is an element with a coordination number of three from Group 15 or an element with a coordination number of two from Group 16 of the Periodic Table of Elements. Preferably J contains a nitrogen, phosphorus, oxygen or sulfur atom with nitrogen being most preferred.

In an embodiment of the invention, the bulky ligand metallocene-type catalyst compounds are heterocyclic ligand complexes where the bulky ligands, the ring(s) or ring system(s), include one or more heteroatoms or a combination thereof. Non-limiting examples of heteroatoms include a Group 13 to 16 element, preferably nitrogen, boron, sulfur, oxygen, aluminum, silicon, phosphorous and tin. Examples of these bulky ligand metallocene-type catalyst compounds are described in WO 96/33202, WO 96/34021, WO 97/17379 and WO 98/22486 and EP-A1-0 874 005 and U.S. Pat. Nos. 5,637,660, 5,539,124, 5,554,775, 5,756,611, 5,233,049, 5,744,417, and 5,856,258 all of which are herein incorporated by reference.

In one embodiment, the bulky ligand metallocene-type catalyst compounds are those complexes known as transition metal catalysts based on bidentate ligands containing pyridine or quinoline moieties, such as those described in U.S. Pat. No. 6,103,657 which is herein incorporated by reference. In another embodiment, the bulky ligand metallocene-type catalyst compounds are those described in PCT publications WO 99/01481 and WO 98/42664, which are fully incorporated herein by reference.

In a preferred embodiment, the bulky ligand type metallocene-type catalyst compound is a complex of a metal, preferably a transition metal, a bulky ligand, preferably a substituted or unsubstituted pi-bonded ligand, and one or more heteroallyl moieties, such as those described in U.S. Pat. Nos. 5,527,752 and 5,747,406 and EP-B1-0 735 057, all of which are herein fully incorporated by reference.

In a particularly preferred embodiment, the other metal compound or second metal compound is the bulky ligand metallocene-type catalyst compound is represented by the formula:

$$L^P MQ_2(YZ)X_n \qquad (VI)$$

where M is a Group 3 to 16 metal, preferably a Group 4 to 12 transition metal, and most preferably a Group 4, 5 or 6 transition metal; $L^P$ is a bulky ligand that is bonded to M; each Q is independently bonded to M and $Q_2(YZ)$ forms a ligand, preferably a unicharged polydentate ligand; A or Q is a univalent anionic ligand also bonded to M; X is a univalent anionic group when n is 2 or X is a divalent anionic group when n is 1; n is 1 or 2.

In formula (VI), L and M are as defined above for formula (III). Q is as defined above for formula (III), preferably Q is selected from the group consisting of —O—, —NR—, —CR$_2$— and —S—; Y is either C or S; Z is selected from the group consisting of —OR, —NR$_2$, —CR$_3$, —SR, —SiR$_3$, —PR$_2$, —H, and substituted or unsubstituted aryl groups, with the proviso that when Q is —NR— then Z is selected from one of the group consisting of —OR, —NR$_2$, —SR, —SiR$_3$, —PR$_2$ and —H; R is selected from a group containing carbon, silicon, nitrogen, oxygen, and/or phosphorus, preferably where R is a hydrocarbon group containing from 1 to 20 carbon atoms, most preferably an alkyl, cycloalkyl, or an aryl group; n is an integer from 1 to 4, preferably 1 or 2; X is a univalent anionic group when n is 2 or X is a divalent anionic group when n is 1; preferably X is a carbamate, carboxylate, or other heteroallyl moiety described by the Q, Y and Z combination.

In a particularly preferred embodiment the bulky ligand metallocene-type compound is represented by the formula:

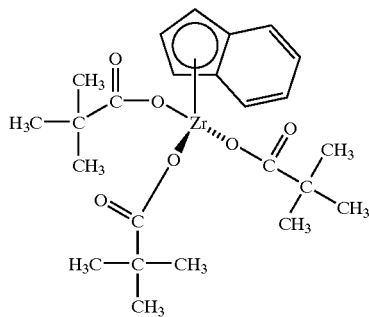

Activator and Activation Methods

The metal compounds described herein are preferably combined with one or more activators to form an olefin polymerization catalyst system.

For the purposes of this patent specification and appended claims, the term "activator" is defined to be any compound or component or method which can activate any of the Group 15 containing metal compounds and/or the bulky ligand metallocene-type catalyst compounds of the invention as described above. Non-limiting activators, for example may include a Lewis acid or a non-coordinating ionic activator or ionizing activator or any other compound including Lewis bases, aluminum alkyls, conventional-type cocatalysts and combinations thereof that can convert a neutral bulky ligand metallocene-type catalyst compound or Group 15 containing metal compound to a catalytically active Group 15 containing metal compound or bulky ligand metallocene-type cation. It is within the scope of this invention to use alumoxane or modified alumoxane as an activator, and/or to also use ionizing activators, neutral or ionic, such as tri (n-butyl) ammonium tetrakis (pentafluorophenyl) boron, a trisperfluorophenyl boron metalloid precursor or a trisperfluoronaphtyl boron metalloid precursor, polyhalogenated heteroborane anions (WO 98/43983) or combination thereof, that would ionize the neutral bulky ligand metallocene-type catalyst and/or the Group 15 containing metal compound.

In one embodiment, an activation method using ionizing ionic compounds not containing an active proton but capable of producing a Group 15 containing metal compound cation or bulky ligand metallocene-type catalyst cation and their non-coordinating anion are also contemplated, and are described in EP-A-0 426 637, EP-A-0 573 403 and U.S. Pat. No. 5,387,568, which are all herein incorporated by reference.

There are a variety of methods for preparing alumoxane and modified alumoxanes, non-limiting examples of which are described in U.S. Pat. Nos. 4,665,208, 4,952,540, 5,091,352, 5,206,199, 5,204,419, 4,874,734, 4,924,018, 4,908,463, 4,968,827, 5,308,815, 5,329,032, 5,248,801, 5,235,081, 5,157,137, 5,103,031, 5,391,793, 5,391,529, 5,693,838, 5,731,253, 5,731,451, 5,744,656, 5,847,177, 5,854,166, 5,856,256 and 5,939,346 and European publications EP-A-0 561 476, EP-B1-0 279 586, EP-A-0 594-218 and EP-B1-0 586 665, and PCT publication WO 94/10180, all of which are herein fully incorporated by reference.

Organoaluminum compounds useful as activators include trimethylaluminum, triethylaluminum, triisobutylaluminum, tri-n-hexylaluminum, tri-noctylaluminum and the like.

Ionizing compounds may contain an active proton, or some other cation associated with but not coordinated to or only loosely coordinated to the remaining ion of the ionizing compound. Such compounds and the like are described in European publications EP-A-0 570 982, EP-A-0 520 732, EP-A-0 495 375, EP-B1-0 500 944, EP-A-0 277 003 and EP-A-0 277 004, and U.S. Pat. Nos. 5,153,157, 5,198,401, 5,066,741, 5,206,197, 5,241,025, 5,384,299 and 5,502,124 and U.S. patent application Ser. No. 08/285,380, filed Aug. 3, 1994, all of which are herein fully incorporated by reference.

Other activators include those described in PCT publication WO 98/07515 such as tris (2,2',2"-nonafluorobiphenyl) fluoroaluminate, which publication is fully incorporated herein by reference. Combinations of activators are also contemplated by the invention, for example, alumoxanes and ionizing activators in combinations, see for example, EP-B1 0 573 120, PCT publications WO 94/07928 and WO 95/14044 and U.S. Pat. Nos. 5,153,157 and 5,453,410 all of which are herein fully incorporated by reference. WO 98/09996 incorporated herein by reference describes activating bulky ligand metallocene-type catalyst compounds with perchlorates, periodates and iodates including their hydrates. WO 98/30602 and WO 98/30603 incorporated by reference describe the use of lithium (2,2'-bisphenyl-ditrimethylsilicate).4THF as an activator for a bulky ligand metallocene-type catalyst compound. WO 99/18135 incorporated herein by reference describes the use of organo-boron-aluminum acitivators. EP-B1-0 781 299 describes using a silylium salt in combination with a non-coordinating compatible anion. Also, methods of activation such as using radiation (see EP-B1-0 615 981 herein incorporated by reference), electro-chemical oxidation, and the like are also contemplated as activating methods for the purposes of rendering the neutral bulky ligand metallocene-type catalyst compound or precursor to a bulky ligand metallocene-type cation capable of polymerizing olefins. Other activators or methods for activating a bulky ligand metallocene-type catalyst compound are described in for example, U.S. Pat. Nos. 5,849,852, 5,859,653 and 5,869,723 and WO 98/32775, WO 99/42467 (dioctadecylmethylammonium-bis (tris(pentafluorophenyl)borane)benzimidazolide), which are herein incorporated by reference.

It is also within the scope of this invention that the above described Group 15 containing metal compounds and bulky ligand metallocene-type catalyst compounds can be combined with one or more of the catalyst compounds represented by formulas (III) through (VI) with one or more activators or activation methods described above.

It is also contemplated that any one of the bulky ligand metallocene-type catalyst compounds of the invention have at least one fluoride or fluorine containing leaving group ma described in U.S. Pat. No. 6,632,904.

In a preferred embodiment modified alumoxanes are combined with the first and second metal compounds of the invention to form a catalyst system. In a preferred embodiment MMAO3A (modified methyl alumoxane in heptane, commercially available from Akzo Chemicals, Inc., Holland, under the trade name Modified Methylalumoxane type 3A, see for example those aluminoxanes disclosed in U.S. Pat. No. 5,041,584, which is herein incorporated by reference) is combined with the first and second metal compounds to form a catalyst system.

The first and second metal compounds may be combined at molar ratios of 1:1000 to 1000:1, preferably 1:99 to 99:1, preferably 10:90 to 90:10, more preferably 20:80 to 80:20, more preferably 30:70 to 70:30, more preferably 40:60 to 60:40. The particular ratio chosen will depend on the end product desired and/or the method of activation.

In a particular embodiment, when using, the metal compounds represented by Formula 1 and Formula 2, where both are activated with the same activator, the preferred weight percents, based upon the weight of the two metal compounds, but not the activator or any support, are 10 to 95 weight % compound of formula 1 and 5 to 90 weight % compound of formula 2, preferably 50 to 90 weight % compound of Formula 1 and 10 to 50 weight % compound of formula 2, more preferably 60 to 80 weight % compound of formula 1 to 40 to 20 weight % compound of formula 2. In a particularly preferred embodiment the compound of Formula 2 is activated with methylalumoxane, then combined with the compound of Formula 2, then injected in the reactor.

In one particular embodiment, when using Compound I and indenyl zirconium tris-pivalate where both are activated with the same activator, the preferred weight percents, based upon the weight of the two catalysts, but not the activator or any support, are 10 to 95 weight % Compound I and 5 to 90 weight % indenyl zirconium tris-pivalate, preferably 50 to 90 weight % Compound I and 10 to 50 weight % indenyl zirconium tris-pivalate, more preferably 60–80 weight % Compound I to 40 to 20 weight % indenyl zirconium tris-pivalate. In a particularly preferred embodiment the indenyl zirconium tris-pivalate is activated with methylalumoxane, then combined with Compound I, then injected in the reactor.

In general the combined metal compounds and the activator are combined in ratios of about 1000: 1 to about 0.5:1. In a preferred embodiment the metal compounds and the activator are combined in a ratio of about 300:1 to about 1:1, preferably about 150:1 to about 1:1, for boranes, borates, aluminates, etc. the ratio is preferably about 1:1 to about 10:1 and for alkyl aluminum compounds (such as diethylaluminum chloride combined with water) the ratio is preferably about 0.5:1 to about 10:1.

Conventional-Type Catalyst Systems Combinable with Formulae I and II

The mixed catalyst composition of the present invention may alternately include the Group 15 containing metal compound, as described above, and a conventional-type transition catalyst.

Conventional-type transition metal catalysts are those traditional Ziegler-Natta, vanadium and Phillips-type catalysts well known in the art. Such as, for example Ziegler- Natta catalysts as described in *Ziegler-Natta Catalysts and Polymerizations*, John Boor, Academic Press, New York, 1979. Examples of conventional-type transition metal catalysts are also discussed in U.S. Pat. Nos. 4,115,639, 4,077,904, 4,482,687, 4,564,605, 4,721,763, 4,879,359 and 4,960,741 all of which are herein fully incorporated by reference. The conventional-type transition metal catalyst compounds that may be used in the present invention include transition metal compounds from Groups 3 to 17, preferably 4 to 12, more preferably 4 to 6 of the Periodic Table of Elements.

These conventional-type transition metal catalysts may be represented by the formula: $MR_x$, where M is a metal from Groups 3 to 17, preferably Group 4 to 6, more preferably Group 4, most preferably titanium; R is a halogen or a hydrocarbyloxy group; and x is the oxidation state of the metal M. Non-limiting examples of R include alkoxy, phenoxy, bromide, chloride and fluoride. Non-limiting examples of conventional-type transition metal catalysts where M is titanium include $TiCl_4$, $TiBr_4$, $Ti(OC_2H_5)_3Cl$, $Ti(OC_2H_5)Cl_3$, $Ti(OC_4H_9)_3Cl$, $Ti(OC_3H_7)_2Cl_2$, $Ti(OC_2H_5)_2$, $TiCl_3.1/3AlCl_3Cl$, $Ti(OC_{12}H_{25})Cl_3$.

Conventional-type transition metal catalyst compounds based on magnesium/titanium electron-donor complexes that are useful in the invention are described in, for example, U.S. Pat. Nos. 4,302,565 and 4,302,566, which are herein fully incorporate by reference. The $MgTiCl_6$ (ethyl acetate)$_4$ derivative is particularly preferred.

British Patent Application 2,105,355 and U.S. Pat. No. 5,317,036, herein incorporated by reference, describes various conventional-type vanadium catalyst compounds. Non-limiting examples of conventional-type vanadium catalyst compounds include vanadyl trihalide, alkoxy halides and alkoxides such as $VOCl_3$, $VOCl_2(OBu)$ where Bu=butyl and $VO(OC_2H_5)_3$; vanadium tetra-halide and vanadium alkoxy halides such as $VCl_4$ and $VCl_3(OBu)$; vanadium and vanadyl acetyl acetonates and chloroacetyl acetonates such as $V(AcAc)_3$ and $VOCl_2(AcAc)$ where (AcAc) is an acetyl acetonate. The preferred conventional-type vanadium catalyst compounds are $VOCl_3$, $VCl_4$ and $VOCl_2$—OR where R is a hydrocarbon radical, preferably a $C_1$ to $C_{10}$ aliphatic or aromatic hydrocarbon radical such as ethyl, phenyl, isopropyl, butyl, propyl, n-butyl, iso-butyl, tertiary-butyl, hexyl, cyclohexyl, naphthyl, etc., and vanadium acetyl acetonates.

Conventional-type chromium catalyst compounds, often referred to as Phillips-type catalysts, suitable for use in the present invention include $CrO_3$, chromocene, silyl chromate, chromyl chloride ($CrO_2Cl_2$), chromium-2-ethyl-hexanoate, chromium acetylacetonate ($Cr(AcAc)_3$), and the like. Non-limiting examples are disclosed in U.S. Pat. Nos. 3,709,853, 3,709,954, 3,231,550, 3,242,099 and 4,077,904, which are herein fully incorporated by reference.

Still other conventional-type transition metal catalyst compounds and catalyst systems suitable for use in the present invention are disclosed in U.S. Pat. Nos. 4,124,532, 4,302,565, 4,302,566, 4,376,062, 4,379,758, 5,066,737, 5,763,723, 5,849,655, 5,852,144, 5,854,164 and 5,869,585 and published EP-A2 0 416 815 A2 and EP-A1 0 420 436, which are all herein incorporated by reference.

Other catalysts may include cationic catalysts such as $AlCl_3$, and other cobalt, iron, nickel and palladium catalysts well known in the art. See for example U.S. Pat. Nos. 3,487,112, 4,472,559, 4,182,814 and 4,689,437 all of which are incorporated herein by reference.

Typically, these conventional-type transition metal catalyst compounds excluding some conventional-type chromium catalyst compounds are activated with one or more of the conventional-type cocatalysts described below. Also conventional type transition metal catalysts can be activated using the activators described above in this patent specification as appreciated by one in the art.

Conventional-type cocatalyst compounds for the above conventional-type transition metal catalyst compounds may be represented by the formula $M^3M^4_vX^2_cR^3_{b-c}$, wherein $M^3$ is a metal from Group 1 to 3 and 12 to 13 of the Periodic Table of Elements; $M^4$ is a metal of Group 1 of the Periodic Table of Elements; v is a number from 0 to 1; each $X^2$ is any halogen; c is a number from 0 to 3; each $R^3$ is a monovalent hydrocarbon radical or hydrogen; b is a number from 1 to 4; and wherein b minus c is at least 1. Other conventional-type organometallic cocatalyst compounds for the above conventional-type transition metal catalysts have the formula $M^3R^3_k$, where $M^3$ is a Group IA, IIA, IIB or IIIA metal, such as lithium, sodium, beryllium, barium, boron, aluminum, zinc, cadmium, and gallium; k equals 1, 2 or 3 depending upon the valency of $M^3$ which valency in turn normally depends on the particular Group to which $M^3$ belongs; and each $R^3$ may be any monovalent hydrocarbon radical.

Non-limiting examples of conventional-type organometallic cocatalyst compounds useful with the conventional-type catalyst compounds described above include methyllithium, butyllithium, dihexylmercury, butylmagnesium, diethylcadmium, benzylpotassium, diethylzinc, tri-n-butylaluminum, diisobutyl ethylboron, diethylcadmium, di-n-butylzinc and tri-n-amylboron, and, in particular, the aluminum alkyls, such as tri-hexyl-aluminum, triethylaluminum, trimethylaluminum, and triisobutylaluminum. Other conventional-type cocatalyst compounds include monoorganohalides and hydrides of Group 2 metals, and mono- or di-organohalides and hydrides of Group 3 and 13 metals. Non-limiting examples of such conventional-type cocatalyst compounds include di-isobutylaluminum bromide, isobutylboron dichloride, methyl magnesium chloride, ethylberyllium chloride, ethylcalcium bromide, diisobutylaluminum hydride, methylcadmium hydride, diethylboron hydride, hexylberyllium hydride, dipropylboron hydride, octylmagnesium hydride, butylzinc hydride, dichloroboron hydride, di-bromo-aluminum hydride and bromocadmium hydride. Conventional-type organometallic cocatalyst compounds are known to those in the art and a more complete discussion of these compounds may be found in U.S. Pat. Nos. 3,221,002 and 5,093,415, which are herein fully incorporated by reference.

Polymerization Process

The metal compounds, mixed metal compounds and catalyst systems described above are suitable for use in any polymerization process, including solution, gas or slurry processes or a combination thereof. The polymerization process is preferably a gas or slurry phase process and more preferably utilizes a single reactor, and most preferably a single gas phase reactor.

In a preferred embodiment, the catalyst system consists of the metal compounds (catalyst) and or the activator (cocatalyst) which are preferably introduced into the reactor in solution. Solutions of the metal compounds are prepared by taking the catalyst and dissolving it in any suitable solvent such as an alkane, toluene, xylene, etc. The solvent may first be purified in order to remove any poisons, which may affect the catalyst activity, including any trace water and/or oxygenated compounds. Purification of the solvent may be accomplished by using activated alumina and activated supported copper catalyst. The catalyst is preferably completely dissolved into the solution to form a homogeneous solution. Both catalysts may be dissolved into the same solvent, if desired. Once the catalysts are in solution, they may be stored indefinitely until use.

For polymerization, it is preferred that the catalyst is combined with an activator prior to introduction into the reactor. Additionally, other solvents and reactants can be added to the catalyst solutions (on-line or off-line), to the activator (on-line or off-line), or to the activated catalyst or catalysts. See U.S. Pat. Nos. 5,317,036 and 5,693,727, EP-A-0 593 083, and WO 97/46599 which are fully incorporated herein by reference, that describe solution feed systems to a reactor. There are many different configurations which are possible to combine the catalysts and activator.

The catalyst system, the metal compounds and or the activator are preferably introduced into the reactor in one or more solutions. The metal compounds may be activated independently, in series or together. In one embodiment a solution of the two activated metal compounds in an alkane such as pentane, hexane, toluene, isopentane or the like is introduced into a gas phase or slurry phase reactor. In another embodiment the catalysts system or the components can be introduced into the reactor in a suspension or an emulsion. In one embodiment, the second metal compound is contacted with the activator, such as modified methylalumoxane, in a solvent and just before the solution is fed into a gas, slurry or solution phase reactor. A solution of the Group 15 containing metal compound is combined with a solution of the second compound and the activator and then introduced into the reactor.

In the following illustrations, A refers to a catalyst or mixture of catalysts, and B refers to a different catalyst or mixture of catalysts. The mixtures of catalysts in A and B can be the same catalysts, just in different ratios. Further, it is noted that additional solvents or inert gases may be added at many locations.

Illustration 1: A and B plus the activator are mixed off-line and then fed to the reactor.

Illustration 2: A and B are mixed off-line. Activator is added in-line and then fed to the reactor.

Illustration 3: A or B is contacted with the activator (off-line) and then either A or B is added in-line before entering the reactor.

Illustration 4: A or B is contacted with the activator (on-line) and then either A or B is added in-line before entering the reactor.

Illustration 5: A and B are each contacted with the activator off-line. Then A and activator and B and activator are contacted in line before entering the reactor.

Illustration 6: A and B are each contacted with the activator in-line. Then A and activator and B and activator are contacted in-line before entering the reactor. (This is a preferred configuration since the ratio of A to B and the ratio of activator to A and the ratio of activator to B can be controlled independently.)

Illustration 7: In this example, A or B is contacted with the activator (on-line) while a separate solution of either A or B is contacted with activator off-line. Then both stream of A or B and activator are contacted in-line before entering the reactor.

Illustration 8: A is contacted on-line with B. Then, an activator is fed to in-line to the A and B mixture.

Illustration 9: A is activated with activator off-line. Then A and activator is contacted on-line with B. Then, an activator is fed to in-line to the A and B and activator mixture.

In one embodiment, this invention is directed toward the polymerization or copolymerization reactions involving the polymerization of one or more monomers having from 2 to 30 carbon atoms, preferably 2 to 12 carbon atoms, and more preferably 2 to 8 carbon atoms. The invention is particularly well suited to the copolymerization reactions involving the polymerization of one or more olefin monomers of ethylene, propylene, butene-1, pentene-1, 4-methyl-pentene-1, hexene-1, octene-1, decene-1, 3-methyl-pentene-1, 3,5,5-trimethyl-hexene-1 and cyclic olefins or a combination thereof. Other monomers can include vinyl monomers, diolefins such as dienes, polyenes, norbornene, norbornadiene monomers. Preferably a copolymer of ethylene is produced, where the comonomer is at least one alpha-olefin having from 4 to 15 carbon atoms, preferably from 4 to 12 carbon atoms, more preferably from 4 to 8 carbon atoms and most preferably from 4 to 7 carbon atoms. In an alternate embodiment, the geminally disubstituted olefins disclosed in WO 98/37109 may be polymerized or copolymerized using the invention herein described.

In another embodiment ethylene or propylene is polymerized with at least two different comonomers to form a terpolymer. The preferred comonomers are a combination of alpha-olefin monomers having 4 to 10 carbon atoms, more preferably 4 to 8 carbon atoms, optionally with at least one diene monomer. The preferred terpolymers include the combinations such as ethylene/butene-1/hexene-1, ethylene/propylene/butene-1, propylene/ethylene/hexene-1, ethylene/propylene/norbornene and the like.

In a particularly preferred embodiment the process of the invention relates to the polymerization of ethylene and at least one comonomer having from 4 to 8 carbon atoms, preferably 4 to 7 carbon atoms. Particularly, the comonomers are butene-1, 4-methyl-pentene-1, hexene-1 and octene-1, the most preferred being hexene-1 and/or butene-1.

Typically in a gas phase polymerization process a continuous cycle is employed where in one part of the cycle of a reactor system, a cycling gas stream, otherwise known as a recycle stream or fluidizing medium, is heated in the reactor by the heat of polymerization. This heat is removed from the recycle composition in another part of the cycle by a cooling system external to the reactor. Generally, in a gas fluidized bed process for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. (See for example U.S. Pat. Nos. 4,543,399, 4,588,790, 5,028,670, 5,317,036, 5,352,749, 5,405,922, 5,436,304, 5,453,471, 5,462,999, 5,616,661 and 5,668,228 all of which are fully incorporated herein by reference.)

The reactor pressure in a gas phase process may vary from about 10 psig (69 kPa) to about 500 psig (3448 kPa), preferably in the range of from about 100 psig (690 kPa) to about 400 psig (2759 kPa), preferably in the range of from about 200 psig (1379 kPa) to about 400 psig (2759 kPa), more preferably in the range of from about 250 psig (1724 kPa) to about 350 psig (2414 kPa).

The reactor temperature in the gas phase process may vary from about 30° C. to about 120° C., preferably from about 60° C. to about 115° C., more preferably in the range of from about 75° C. to about 110° C., and most preferably in the range of from about 85° C. to about 110° C. Altering the polymerization temperature can also be used as a tool to alter the final polymer product properties.

The productivity of the catalyst or catalyst system is influenced by the main monomer partial pressure. The preferred mole percent of the main monomer, ethylene or propylene, preferably ethylene, is from about 25 to 90 mole percent and the monomer partial pressure is in the range of from about 75 psia (517 kPa) to about 300 psia (2069 kPa), which are typical conditions in a gas phase polymerization process. In one embodiment the ethylene partial pressure is about 220 to 240 psi (1517–1653 kPa). In another embodiment the molar ratio of hexene to ethylene ins the reactor is 0.03:1 to 0.08:1.

In a preferred embodiment, the reactor utilized in the present invention and the process of the invention produce greater than 500 lbs of polymer per hour (227 Kg/hr) to about 200,000 lbs/hr (90,900 Kg/hr) or higher of polymer, preferably greater than 1000 lbs/hr (455 Kg/hr), more preferably greater than 10,000 lbs/hr (4540 Kg/hr), even more preferably greater than 25,000 lbs/hr (11,300 Kg/hr), still more preferably greater than 35,000 lbs/hr (15,900 Kg/hr), still even more preferably greater than 50,000 lbs/hr (22,700 Kg/hr) and most preferably greater than 65,000 lbs/hr (29,000 Kg/hr) to greater than 100,000 lbs/hr (45,500 Kg/hr).

Other gas phase processes contemplated by the process of the invention include those described in U.S. Pat. Nos. 5,627,242, 5,665,818 and 5,677,375, and European publications EP-A-0 794 200, EP-A-0 802 202 and EP-B-634 421 all of which are herein fully incorporated by reference.

A slurry polymerization process generally uses pressures in the range of from about 1 to about 50 atmospheres and even greater and temperatures in the range of 0° C. to about 120° C. In a slurry polymerization, a suspension of solid, particulate polymer is formed in a liquid polymerization diluent medium to which ethylene and comonomers and often hydrogen along with catalyst are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, preferably a branched alkane. The medium employed should be liquid under the conditions of polymerization and relatively inert. When a propane medium is used the process must be operated above the reaction diluent critical temperature and pressure. Preferably, a hexane or an isobutane medium is employed.

In one embodiment, a preferred polymerization technique of the invention is referred to as a particle form polymerization, or a slurry process where the temperature is kept below the temperature at which the polymer goes into solution. Such technique is well known in the art, and described in for instance U.S. Pat. No. 3,248,179 which is fully incorporated herein by reference. The preferred temperature in the particle form process is within the range of about 185° F. (85° C.) to about 230° F. (110° C.). Two preferred polymerization methods for the slurry process are those employing a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. No. 4,613,484, which is herein fully incorporated by reference.

In another embodiment, the slurry process is carried out continuously in a loop reactor. The catalyst as a solution, as a suspension, as an emulsion, as a slurry in isobutane or as a dry free flowing powder is injected regularly to the reactor loop, which is itself filled with circulating slurry of growing polymer particles in a diluent of isobutane containing monomer and comonomer. Hydrogen, optionally, may be added as a molecular weight control. The reactor is maintained at pressure of about 525 psig to 625 psig (3620 kPa to 4309 kPa) and at a temperature in the range of about 140° F. to about 220° F. (about 60° C. to about 104° C.) depending on the desired polymer density. Reaction heat is removed through the loop wall since much of the reactor is in the form of a double-jacketed pipe. The slurry is allowed to exit the reactor at regular intervals or continuously to a heated low pressure flash vessel, rotary dryer and a nitrogen purge colunm in sequence for removal of the isobutane diluent and all unreacted monomer and comonomers. The resulting hydrocarbon free powder is then compounded for use in various applications.

In an embodiment the reactor used in the slurry process of the invention is capable of and the process of the invention is producing greater than 2000 lbs of polymer per hour (907 Kg/hr), more preferably greater than 5000 lbs/hr (2268 Kg/hr), and most preferably greater than 10,000 lbs/hr (4540 Kg/hr). In another embodiment the slurry reactor used in the process of the invention is producing greater than 15,000 lbs of polymer per hour (6804 Kg/hr), preferably greater than 25,000 lbs/hr (11,340 Kg/hr) to about 100,000 lbs/hr (45,500 Kg/hr).

In another embodiment in the slurry process of the invention the total reactor pressure is in the range of from 400 psig (2758 kPa) to 800 psig (5516 kPa), preferably 450 psig (3103 kPa) to about 700 psig (4827 kPa), more preferably 500 psig (3448 kPa) to about 650 psig (4482 kPa), most preferably from about 525 psig (3620 kPa) to 625 psig (4309 kPa).

In yet another embodiment in the slurry process of the invention the concentration of ethylene in the reactor liquid medium is in the range of from about 1 to 10 weight percent, preferably from about 2 to about 7 weight percent, more preferably from about 2.5 to about 6 weight percent, most preferably from about 3 to about 6 weight percent.

A preferred process of the invention is where the process, preferably a slurry or gas phase process is operated in the absence of or essentially free of any scavengers, such as triethylaluminum, trimethylaluminum, tri-isobutylaluminum and tri-n-hexylaluminum and diethyl aluminum chloride, dibutyl zinc and the like. This preferred process is described in PCT publication WO 96/08520 and U.S. Pat. No. 5,712,352, which are herein fully incorporated by reference.

In a preferred embodiment of the invention, a slurry of an aluminum distearate in mineral oil is introduced into the reactor, separately or with the first and or second metal complex and/or with an activator, from the metal compounds and or the activators. More information on using aluminum stearate type additives may be found in U.S. application Ser. No. 09/113,261 filed Jul. 10, 1998, which is incorporated by reference herein.

In an embodiment, if the second metal compound and Group 15 metal compound of the catalyst system are introduced to the reactor in series, it is preferably that the second metal compound is added and/or activated first and that the Group 15 metal compound is added and/or activated second.

In another embodiment, the residence time of the catalyst composition is between about 3 to about 6 hours and preferably between about 3.5 and about 5 hours.

In an embodiment, the mole ratio of comonomer to ethylene, $C_x/C_2$, where $C_x$ is the amount of comonomer and $C_2$ is the amount of ethylene is between about 0.001 to 0.0100 and more preferably between about 0.002 to 0.008.

The melt index (and other properties) of the polymer produced may be changed by manipulating hydrogen concentration in the polymerization system by:

1.) changing the amount of the first catalyst in the polymerization system, and/or
2.) changing the amount of the second catalyst in the polymerization system, and/or
3.) adding hydrogen to the polymerization process; and/or
4.) changing the amount of liquid and/or gas that is withdrawn and/or purged from the process; and/or
5.) changing the amount and/or composition of a recovered liquid and/or recovered gas returned to the polymerization process, said recovered liquid or recovered gas being recovered from polymer discharged from the polymerization process; and/or
6.) using a hydrogenation catalyst in the polymerization process; and/or
7.) changing the polymerization temperature; and/or
8.) changing the ethylene partial pressure in the polymerization process; and/or
9.) changing the ethylene to hexene ratio in the polymerization process; and/or
10.) changing the activator to transition metal ratio in the activation sequence.

The hydrogen concentration in the reactor is about 100 to 5000 ppm, preferably 200 to 2000 ppm, more preferably 250 to 1900 ppm, more preferably 300 to 1800 ppm, and more preferably 350 to 1700 ppm, more preferably 400 to 1600 ppm, more preferably 500 to 1500 ppm, more preferably 500 to 1400 ppm, more preferably 500 to 1200 ppm, more preferably 600 to 1200 ppm, preferably 700 to 1100 ppm, and more preferably 800 to 1000 ppm. The hydrogen concentration in the reactor being inversely proportional to the polymer's weight average molecular weight ($M_w$).

The catalyst and/or the activator may be placed on, deposited on, contacted with, incorporated within, adsorbed, or absorbed in a support. Typically the support is any of the solid, porous supports, including microporous supports. Typical support materials include talc; inorganic oxides such as silica, magnesium chloride, alumina, silica-alumina; polymeric supports such as polyethylene, polypropylene, polystyrene, cross-linked polystyrene; and the like. Preferably the support is used in finely divided form. Prior to use the support is preferably partially or completely dehydrated. The dehydration may be done physically by calcining or by chemically converting all or part of the active hydroxyls. For more information on how to support catalysts, see U.S. Pat. No. 4,808,561 which discloses how to support a metallocene catalyst system. In addition, there are various other techniques of supporting catalysts as are well known in the art. Methods for supporting the Group 15 metal compound of the invention are described in U.S. Pat. No. 6,271,325 which is herein incorporated by reference.

Polymer of the Invention

The new polymers produced by the process of the present invention may be used in a wide variety of products and end use applications. Preferably the new polymers include polyethylene, and even more preferably include bimodal polyethylene produced in a single reactor. In addition to bimodal polymers, it is not beyond the scope of the present application to produce a unimodal or multi-modal polymer.

The Group 15 containing metal compound, when used alone, produces a high weight average molecular weight $M_W$ polymer (such as for example above 100,000, preferably above 150,000, preferably above 200,000, preferably above 250,000, more preferably above 300,000). The second metal compound, when used alone, produces a low molecular weight polymer (such as for example below 80,000, preferably below 70,000, preferably below 60,000, more preferably below 50,000, more preferably below 40,000, more preferably below 30,000, more preferably below 20,000 and above 5,000, more preferably below 20,000 and above 10,000).

The polyolefins, particularly polyethylenes, produced by the present invention, have a density of 0.89 to 0.97 g/cm$^3$. Preferably, polyethylenes having a density of 0.910 to 0.965 g/cm$^3$, more preferably 0.915 to 0.960 g/cm$^3$, and even more preferably 0.920 to 0.955 g/cm$^3$ can be produced. In some embodiments, a density of 0.915 to 0.940 g/cm$^3$ would be preferred, in other embodiments densities of 0.930 to 0.970 g/cm$^3$ are preferred.

In a preferred embodiment, the polyolefin recovered typically has a melt index $I_2$ (as measured by ASTM D-1238, Condition E at 190° C.) of about 0.01 to 1000 dg/min or less. In a preferred embodiment, the polyolefin is ethylene homopolymer or copolymer. In a preferred embodiment for certain applications, such as films, pipes, molded articles and the like, a melt index of 10 dg/min or less is preferred. For some films and molded articles, a melt index of 1 dg/min or less is preferred. Polyethylene having a $I_2$ between 0.01 and 10 dg/min is preferred.

In a preferred embodiment the polymer produced herein has an $I_{21}$ (as measured by ASTM-D-1238-F, at 190° C.) of 0.1 to 10 dg/min, preferably 0.2 to 7.5 dg/min, preferably 2.0 dg/min or less, preferably 1.5 dg/min or less, preferably 1.2 dg/min or less, more preferably between 0.5 and 1.0 dg/min, more preferably between 0.6 and 0.8 dg/min.

In another embodiment, the polymers of the invention have a melt flow index "MIR" of $I_{21}/I_2$ of 80 or more, preferably 90 or more, preferably 100 or more, preferably 125 or more.

In another embodiment the polymer has an $I_{21}$ (as measured by ASTM 1238, condition F, at 190° C.)(sometimes referred to as Flow Index) of 2.0 dg/min or less, preferably 1.5 dg/min or less, preferably 1.2 dg/min or less, more preferably between 0.5 and 1.0 dg/min, more preferably between 0.6 and 0.8 dg/min and an $I_{21}/I_2$ of 80 or more, preferably 90 or more, preferably 100 or more, preferably 125 or more and has one or more of the following properties in addition:

(a) Mw/Mn of between 15 and 80, preferably between 20 and 60, preferably between 20 and 40. Molecular weight (Mw and Mn) are measured as described below in the examples section;

(b) an Mw of 180,000 or more, preferably 200,000 or more, preferably 250,000 or more, preferably 300,000 or more;

(c) a density (as measured by ASTM 2839) of 0.94 to 0.970 g/cm$^3$; preferably 0.945 to 0.965 g/cm$^3$; preferably 0.950 to 0.960 g/cm$^3$;

(d) a residual metal content of 5.0 ppm transition metal or less, preferably 2.0 ppm transition metal or less, preferably 1.8 ppm transition metal or less, preferably 1.6 ppm transition metal or less, preferably 1.5 ppm transition metal or less, preferably 2.0 ppm or less of Group 4 metal, preferably 1.8 ppm or less of Group 4 metal, preferably 1.6 ppm or less of Group 4 metal, preferably 1.5 ppm or less of Group 4 metal, preferably 2.0 ppm or less zirconium, preferably 1.8 ppm or less zirconium, preferably 1.6 ppm or less zirconium, preferably 1.5 ppm or less zirconium(as measured by Inductively Coupled Plasma Optical Emission Spectroscopy (ICPAES) run against commercially available standards, where the sample is heated so as to fully decompose all organics and the solvent comprises nitric acid and, if any support is present, another acid to dissolve any support (such as hydrofluoric acid to dissolve silica supports) is present;

(e) 35 weight percent or more high weight average molecular weight component, as measured by size-exclusion chromatography, preferably 40% or more. In a particularly preferred embodiment the higher molecular weight fraction is present at between 35 and 70 weight %, more preferably between 40 and 60 weight %.

In a preferred embodiment the catalyst composition described above is used to make a polyethylene having a density of between 0.94 and 0.970 g/cm³ (as measured by ASTM D 2839) and an $I_2$ of 0.5 or less g/10 min or less In another embodiment the catalyst composition described above is used to make a polyethylene having an $I_{21}$ of less than 10 and a density of between about 0.940 and 0.950 g/cm³ or an $I_{21}$ of less than 20 and a density of about 0.945 g/cm³ or less.

In another embodiment, the polymer of the invention is made into a pipe by methods known in the art. For pipe applications, the polymers of the invention have a $I_{21}$ of from about 2 to about 10 dg/min and preferably from about 2 to about 8 dg/min. In another embodiment, the pipe of the invention satisfies ISO qualifications.

In another embodiment, the catalyst composition of the present invention is used to make polyethylene pipe able to withstand at least 50 years at an ambient temperature of 20° C., using water as the internal test medium and either water or air as the outside environment (Hydro static (hoop) stress as measured by ISO TR 9080).

In another embodiment, the polymer has a notch tensile test (resistance to slow crack growth) result of greater than 150 hours at 3.0 MPa, preferably greater than 500 hours at 3.0 MPa and more preferably greater than 600 hours at 3.0 mPa. (as measured by ASTM-F1473).

In another embodiment, the catalyst composition of the present invention is used to make polyethylene pipe having a predicted S-4 $T_c$ for 110 mm pipe of less than −5° C., preferably of less than −15° C. and more preferably less than −40° C. (ISO DIS 13477/ASTM F1589).

In another embodiment, the polymer has an extrusion rate of greater than about 17 lbs/hour/inch of die circumference and preferably greater than about 20 lbs/hour/inch of die circumference and more preferably greater than about 22 lbs/hour/inch of die circumference.

The polyolefins of the invention can be made into films, molded articles (including pipes), sheets, wire and cable coating and the like. The films may be formed by any of the conventional techniques known in the art including extrusion, co-extrusion, lamination, blowing and casting. The film may be obtained by the flat film or tubular process which may be followed by orientation in a uniaxial direction or in two mutually perpendicular directions in the plane of the film to the same or different extents. Orientation may be to the same extent in both directions or may be to different extents. Particularly preferred methods to form the polymers into films include extrusion or coextrusion on a blown or cast film line.

In another embodiment, the polymer of the invention is made into a film by methods known in the art. For film application, the polymers of the invention have a $I_{21}$ of from about 2 to about 50 dg/min, preferably from about 2 to about 30 dg/min, even more preferably from about 2 to about 20 dg/min, still more preferably about 5 to about 15 dg/min and yet more preferably from about 5 to about 10 dg/min.

In another embodiment, the polymer has an MD Tear of 0.5 mil (13μ) film of between about 5 g/mil and 25 g/mil preferably, between about 15 g/mil and 25 g/mil, and more preferably between about 20 g/mil and 25 g/mil.

The films produced may further contain additives such as slip, antiblock, antioxidants, pigments, fillers, antifog, UV stabilizers, antistats, polymer processing aids, neutralizers, lubricants, surfactants, pigments, dyes and nucleating agents. Preferred additives include silicon dioxide, synthetic silica, titanium dioxide, polydimethylsiloxane, calcium carbonate, metal stearates, calcium stearate, zinc stearate, talc, $BaSO_4$, diatomaceous earth, wax, carbon black, flame retarding additives, low molecular weight resins, hydrocarbon resins, glass beads and the like. The additives may be present in the typically effective amounts well known in the art, such as 0.001 weight % to 10 weight %.

In another embodiment, the polymer of the invention is made into a molded article by methods known in the art, for example, by blow molding and injection-stretch molding. For molded applications, the polymers of the invention have a $I_{21}$ of from about 20 dg/min to about 50 dg/min and preferably from about 35 dg/min to about 45 dg/min.

In another embodiment, the polymers of the invention, including those described above, have an ash content less than 100 ppm, more preferably less than 75 ppm, and even more preferably less than 50 ppm is produced. In another embodiment, the ash contains negligibly small levels of titanium as measured by Inductively Coupled Plasma/Atomic Emission Spectroscopy (ICPAES) as is well known in the art.

In another embodiment, the polymers of the invention, contain a nitrogen containing ligand detectable by High Resolution Mass Spectroscopy (HRMS) as is well known in the art.

EXAMPLES

In order to provide a better understanding of the present invention, including representative advantages thereof, the following examples are offered.

$M_n$ and $M_w$ were measured by gel permeation chromatography on a waters 150° C. GPC instrument equipped with differential refraction index detectors. The GPC columns were calibrated by running a series of molecular weight standards and the molecular weights were calculated using Mark Houwink coefficients for the polymer in question.

$MWD = M_w/M_n$

Density was measured according to ASTM D 1505.

Melt Index (MI) $I_2$ was measured according to ASTM D-1238, Condition E, at 190° C.

$I_{21}$ was measured according to ASTM D-1238, Condition F, at 190° C.

Melt Index Ratio (MIR) is the ratio of $I_{21}$ over $I_2$.

Weight % comonomer was measured by proton NMR.

Dart Impact was measured according to ASTM D 1709.

MD and TD Elmendorf Tear were measured according to ASTM D 1922.

MD and TD 1% Secant modulus were measured according to ASTM D 882.

MD and TD tensile strength and ultimate tensile strength were measured according to ASTM D 882.

MD and TD elongation and ultimate elongation were measured according to ASTM D 412.

MD and TD Modulus were measured according to ASTM 882-91.

Haze was measured according to ASTM 1003-95, Condition A.

45° gloss was measured according to ASTM D 2457.

BUR is blow up ratio.

"PPH" is pounds per hour. "mPPH" is millipounds per hour. "ppmw" is parts per million by weight.

Indenyl zirconium tris pivalate, a bulky ligand metallocene-type compound, also represented by formula VI, can be prepared by performing the following general reactions:

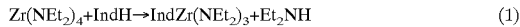

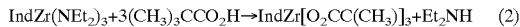

Where Ind=indenyl and Et is ethyl.

Preparation of $[(2,4,6\text{-Me}_3\text{C}_6\text{H}_2)\text{NHCH}_2\text{CH}_2]_2\text{NH}$ ligand (Ligand I)

A 2 L one-armed Schlenk flask was charged with a magnetic stir bar, diethylenetriamine (23.450 g, 0.227 mol), 2-bromomesitylene (90.51 g, 0.455 mol), tris (dibenzylideneacetone)dipalladium (1.041 g, 1.14 mmol), racemic-2,2'-bis(diphenylphosphino)-1,1'-binaphthyl (racemic BINAP) (2.123 g, 3.41 mmol), sodium tert-butoxide (65.535 g, 0.682 mol), and toluene (800 mL) under dry, oxygen-free nitrogen. The reaction mixture was stirred and heated to 100° C. After 18 h the reaction was complete, as judged by proton NMR spectroscopy. All remaining manipulations can be performed in air. All solvent was removed under vacuum and the residues dissolved in diethyl ether (1 L). The ether was washed with water (3×250 mL) followed by saturated aqueous NaCl (180 g in 500 mL) and dried over magnesium sulfate (30 g). Removal of the ether in vacuo yielded a red oil. which was dried at 70° C. for 12 h under vacuum (yield: 71.10 g, 92%). $^1$H NMR ($C_6D_6$) δ 6.83 (s, 4), 3.39 (br s, 2), 2.86 (t, 4), 2.49 (t, 4), 2.27 (s, 12), 2.21 (s, 6), 0.68 (br s, 1).

Preparation of Catalyst A

Preparation of 1.5 wt % Catalyst A in Toluene Solution

Note: All procedures below were performed in a glove box.

1.) Weighed out 100 grams of purified toluene into a 1 L Erlenmeyer flask equipped with a Teflon coated stir bar.

2.) Added 7.28 grams of Tetrabenzyl Zirconium.

3.) Placed solution on agitator and stirred for 5 minutes. All of the solids went into solution.

4.) Added 5.42 grams of Ligand I.

5.) Added an additional 551 grams of purified toluene and allowed mixture to stir for 15 minutes. No solids remained in the solution.

6.) Poured catalyst solution into a clean, purged 1-L Whitey sample cylinder, labeled, removed from glovebox and placed in holding area for operations.

Alternate Preparation of Compound I $\{[(2,4,6\text{-Me}_3\text{C}_6\text{H}_2)\text{NCH}_2\text{CH}_2]_2\text{NH}\}\text{Zr}(\text{CH}_2\text{Ph})_2$ A 500 mL round bottom flask was charged with a magnetic stir bar, tetrabenzyl zirconium (Boulder Scientific) (41.729 g, 91.56 mmol), and 300 mL of toluene under dry, oxygen-free nitrogen. Solid ligand I above (32.773 g, 96.52 mmol) was added with stirring over 1 minute (the desired compound precipitates). The volume of the slurry was reduced to 100 mL and 300 mL of pentane added with stirring. The solid yellow-orange product was collected by filtration and dried under vacuum (44.811 g, 80% yield). $^1$H NMR ($C_6D_6$) δ 7.22–6.81 (m, 12), 5.90 (d, 2), 3.38 (m, 2), 3.11 (m, 2), 3.01 (m, 4), 2.49 (m, 4), 2.43 (s, 6), 2.41 (s, 6), 2.18 (s, 6), 1.89 (s, 2), 0.96 (s, 2).

Preparation of Catalyst B

Preparation 1 wt % Catalyst B in Hexane Solution

All procedures were performed in a glove box.

1.) Transfer 1 liter of purified hexane into a 1 L Erlenmeyer flask equipped with a Teflon coated stir bar.

2.) Add 6.67 grams of indenyl zirconium tris pivalate dried powder.

3.) Place solution on magnetic agitator and stir for 15 minutes. All of the solids go into solution.

4.) Pour solution into a clean, purged 1-L Whitey sample cylinder, labeled, and removed from glovebox and place in holding area until use in operation.

Comparative Example 1

An ethylene-hexene copolymer was produced in a 14-inch (35.6 cm) pilot plant scale gas phase reactor operating at 85° C. and 350 psig (2.4 MPa) total reactor pressure having a water cooled heat exchanger Ethylene was fed to the reactor at a rate of about 40 pounds per hour (18.1 kg/hr), hexene was fed to the reactor at a rate of about 0.6 pounds per hour (0.27 kg/hr) and hydrogen was fed to the reactor at a rate of 5 mPPH. Nitrogen was fed to the reactor as a make-up gas at about 5–8 PPH. The production rate was about 27 PPH. The reactor was equipped with a plenum having about 1,900 PPH of recycle gas flow. (The plenum is a device used to create a particle lean zone in a fluidized bed gas-phase reactor, as described in detail in U.S. Pat. No. 5,693,727 which is incorporated herein by reference.) A tapered catalyst injection nozzle having a 0.041 inch (0.10 cm) hole size was positioned in the plenum gas flow. A solution of 1 wt % of Catalyst A in toluene and cocatalyst (MMAO-3A, 1 wt % Aluminum) were mixed in line prior to passing through the injection nozzle into the fluidized bed. (MMAO-3A is modified methyl alumoxane in heptane, commercially available from Akzo Chemicals, Inc. under the trade name Modified Methylalumoxane type 3A.) MMAO to catalyst was controlled so that the Al:Zr molar ratio was 400:1. Nitrogen and isopentane were also fed to the injection nozzle as needed to maintain a stable average particle size. A unimodal polymer having nominal 0.28 dg/min ($I_{21}$) and 0.935 g/cc (density) properties was obtained. A residual zirconium of 1.63 ppmw was calculated based on a reactor mass balance.

Comparative Example 2

An ethylene-hexene copolymer was produced in a 14-inch (35.6 cm) pilot plant scale gas phase reactor operating at 80° C. and 320 psig (2.2 MPa) total reactor pressure having a water cooled heat exchanger Ethylene was fed to the reactor at a rate of about 37 pounds per hour (19.8 kg/hr), hexene was fed to the reactor at a rate of about 0.4 pounds per hour (0.18 kg/hr) and hydrogen was fed to the reactor at a rate of 12 mPPH. Ethylene was fed to maintain 180 psi (1.2 MPa) ethylene partial pressure in the reactor. The production rate was about 25 PPH. The reactor was equipped with a plenum having about 1,030 PPH of recycle gas flow. (The plenum is a device used to create a particle lean zone in a fluidized bed gas-phase reactor.) A tapered catalyst injection nozzle having a 0.055 inch (0.14 cm) hole size was positioned in the plenum gas flow. A solution of 1 wt % Catalyst B in hexane catalyst was mixed with 0.2 lb/hr (0.09 kg/hr) hexene in a ³⁄₁₆ inch (0.48 cm) stainless steel tube for about 15 minutes. The Catalyst B and hexene mixture were mixed with cocatalyst (MMAO-3A, 1 wt % Aluminum) in a line for about 40 minutes. In addition to the solution, isopentane and nitrogen were added to control particle size. The total system was passed through the injection nozzle into the fluidized bed.

MMAO to catalyst ratio was controlled so that the Al:Zr molar ratio was 300:1. A bimodal polymer was produced which was 797 g/10 min melt index. The density was 0.9678 g/cc. A residual zirconium of 0.7 ppmw was calculated based on a reactor mass balance. SEC analysis and deconvolution using 4 floury distributions was completed and the results are shown in Table I.

Example 3

An ethylene-hexene copolymer was produced in a 14-inch (35.6 cm) pilot plant scale gas phase reactor operating at 80° C. and 320 psig (2.2 MPa) total reactor pressure having a water cooled heat exchanger. Ethylene was fed to the reactor at a rate of about 53 pounds per hour (24 kg/hr), hexene was fed to the reactor at a rate of about 0.5 pounds per hour (0.22 kg/hr) and hydrogen was fed to the reactor at a rate of 9 mPPH. Ethylene was fed to maintain 220 psi (1.52 MPa) ethylene partial pressure in the reactor. The production rate was about 25 PPH. The reactor was equipped with a plenum having about 990 PPH of recycle gas flow. (The plenum is a device used to create a particle lean zone in a fluidized bed gas-phase reactor.) A tapered catalyst injection nozzle having a 0.055 inch (0.12) hole size was positioned in the plenum gas flow. A solution of 1 wt % Catalyst B in hexane catalyst was mixed with 0.2 lb/hr (0.09 kg/hr) hexene in a 3/16 inch (0.48 cm) stainless steel tube for about 15 minutes. The Catalyst B and hexene mixture were mixed with cocatalyst (MMAO-3A, 1 wt % Aluminum) in a line for about 20–25 minutes. In a separate activating stainless steel tube, a 1 wt % Catalyst A in toluene solution was activated with cocatalyst (MMAO-3A, 1 wt % Aluminum) for about 50–55 minutes. The two independently activated solutions were combined into a single process line for about 4 minutes. The quantity of Catalyst A catalyst was about 40–45 mol % of the total solution fed. In addition to the solution, isopentane and nitrogen were added to control particle size. The total system was passed through the injection nozzle into the fluidized bed. MMAO to catalyst ratio was controlled so that the Al:Zr molar ratio was 300:1. A bimodal polymer was produced which was 0.045 g/10 min melt index and 7.48 g/10 min flow index. The density was 0.9496 g/cc. A residual zirconium of 1.7 ppmw was calculated based on a reactor mass balance. SEC analysis and deconvolution using 7–8 floury distributions was completed and the results are shown in Table I.

Example 4

An ethylene-hexene copolymer was produced in a 14-inch (35.6 cm) pilot plant scale gas phase reactor operating at 85° C. and 320 psig (2.2 MPa) total reactor pressure having a water cooled heat exchanger. Ethylene was fed to the reactor at a rate of about 50 pounds per hour (22.7 kg/hr), some of the hexene was fed to the reactor at a rate of about 0.7 pounds per hour (0.32 kg/hr) and hydrogen was fed to the reactor at a rate of 11 mPPH. Ethylene was fed to maintain 220 psi (1.52 MPa) ethylene partial pressure in the reactor. The production rate was about 29 PPH. The reactor was equipped with a plenum having about 970 PPH of recycle gas flow. (The plenum is a device used to create a particle lean zone in a fluidized bed gas-phase reactor.) A tapered catalyst injection nozzle having a 0.055 inch (0.14 cm) hole size was positioned in the plenum gas flow. A solution of 1 wt % Catalyst B in hexane catalyst was mixed with 0.2 lb/hr (0.09 kg/hr) hexene in a 3/16 inch (0.48 cm) stainless steel tube for about 15 minutes. The Catalyst B and hexene mixture were mixed with cocatalyst (MMAO-3A, 1 wt % Aluminum) in a line for about 20–25 minutes. In a separate activating stainless steel tube, a 1 wt % Catalyst A in toluene solution was activated with cocatalyst (MMAO-3A, 1 wt % Aluminum) for about 50–55 minutes. The two independently activated solutions were combined into a single process line for about 4 minutes. The quantity of Catalyst A catalyst was about 40–45 mol % of the total solution fed. In addition to the solution, isopentane and nitrogen were added to control particle size. The total system was passed through the injection nozzle into the fluidized bed. MMAO to catalyst was controlled so that the Al:Zr molar ratio was 300:1. A bimodal polymer was produced which was 0.054 g/10 min melt index and 7.94 g/10 min flow index. The density was 0.948 g/cc. A residual zirconium of 1.1 ppmw was calculated based on a reactor mass balance. SEC analysis and deconvolution using 7–8 floury distributions was completed and the results are shown in Table I.

Example 5

An ethylene-hexene copolymer was produced in a 14-inch (35.6 cm) pilot plant scale gas phase reactor operating at 85° C. and 320 psig (2.2 MPa) total reactor pressure having a water cooled heat exchanger Ethylene was fed to the reactor at a rate of about 60 pounds per hour (27.2 kg/hr), hexene was fed to the reactor at a rate of about 0.8 pounds per hour (0.36 kg/hr) and hydrogen was fed to the reactor at a rate of 13 mPPH. Ethylene was fed to maintain 220 psi (1.52 MPa) ethylene partial pressure in the reactor. The production rate was about 34 PPH. The reactor was equipped with a plenum having about 960 PPH of recycle gas flow. (The plenum is a device used to create a particle lean zone in a fluidized bed gas-phase reactor.) A tapered catalyst injection nozzle having a 0.055 inch (0.14 cm) was positioned in the plenum gas flow. A solution of 1 wt % Catalyst B in hexane catalyst was mixed with 0.2 lb/hr (0.09 kg/hr) hexene in a 3/16 inch (0.48 cm) stainless steel tube for about 15 minutes. The Catalyst B and hexene mixture were mixed with cocatalyst (MMAO-3A, 1 wt % Aluminum) in a line for about 20–25 minutes. In a separate activating stainless steel tube, a 1 wt % Catalyst A in toluene solution was activated with cocatalyst (MMAO-3A, 1 wt % Aluminum) for about 50–55 minutes. The two independently activated solutions were combined into a single process line for about 4 minutes. The quantity of Catalyst A catalyst was about 40–45 mol % of the total solution fed. In addition to the solution, isopentane and nitrogen were added to control particle size. The total system was passed through the injection nozzle into the fluidized bed. MMAO to catalyst ratio was controlled so that the Al:Zr molar ratio was 300:1. A bimodal polymer was produced which was 0.077 g/10 min melt index and 12.7 g/10 min flow index. The density was 0.9487 g/cc. A residual zirconium of 0.9 ppmw was calculated based on a reactor mass balance. SEC analysis and deconvolution using 7–8 floury distributions was completed and the results are shown in Table I.

Example 6

An ethylene-hexene copolymer was produced in a 14-inch (35.6 cm) pilot plant scale gas phase reactor operating at 85° C. and 320 psig (2.2 MPa) total reactor pressure having a water cooled heat exchanger. Ethylene was fed to the reactor at a rate of about 60 pounds per hour (27.2 kg/hr), hexene was fed to the reactor at a rate of about 0.8 pounds per hour (0.36 kg/hr) and hydrogen was fed to the reactor at a rate of 13 mPPH. Ethylene was fed to maintain 220 psi (1.52 MPa) ethylene partial pressure in the reactor. The production rate was about 34 PPH. The reactor was equipped with a plenum having about 1,100 PPH of recycle gas flow. (The plenum is a device used to create a particle lean zone in a fluidized bed gas-phase reactor.) A tapered catalyst injection nozzle having a 0.055 inch (0.14 cm) was positioned in the plenum gas flow. A solution of 1 wt % Catalyst B in hexane catalyst was mixed with 0.2 lb/hr (0.09 kg/hr) hexene in a 3/16 inch (0.48 cm) stainless steel tube for about 15 minutes. The Catalyst B and hexene mixture were mixed with cocatalyst (MMAO-3A, 1 wt % Aluminum) in a line for about 10–15 minutes. 1 wt % Catalyst A in toluene solution was added to the activated Catalyst B solution for about 5 minutes before being sprayed into the reactor. The quantity of Catalyst A catalyst was about 40–45 mol % of the total solution fed. In addition to the solution, isopentane and nitrogen were added to control particle size. The total system was passed through the injection nozzle into the fluidized bed. MMAO to catalyst ratio was controlled so that the final Al:Zr molar ratio was 300:1. A bimodal polymer was produced which was 0.136 g/10 min melt index and 38.1 g/10 min flow index. The density was 0.9488 g/cc. A residual zirconium of 0.5 ppmw was calculated based on a reactor mass balance. SEC analysis and deconvolution using 7–8 floury distributions was completed and the results are shown in Table I.

Example 7

An ethylene-hexene copolymer was produced in a 14-inch (35.6 cm)pilot plant scale gas phase reactor operating at 85° C. and 350 psig (2.4 MPa) total reactor pressure having a water cooled heat exchanger. Ethylene was fed to the reactor at a rate of about 42 pounds per hour (19.1 kg/hr), hexene was fed to the reactor at a rate of about 0.8 pounds per hour (0.36 kg/hr) and hydrogen was fed to the reactor at a rate of 13 mPPH. Ethylene was fed to maintain 220 psi (1.52 MPa) ethylene partial pressure in the reactor. The production rate was about 32 PPH. The reactor was equipped with a plenum having about 2010 PPH of recycle gas flow. (The plenum is a device used to create a particle lean zone in a fluidized bed gas-phase reactor.) A tapered catalyst injection nozzle having a 0.055 inch (0.14 cm) was positioned in the plenum gas flow. A solution of 0.25 wt % Catalyst B in hexane catalyst was mixed with 0.1 lb/hr (0.05 kg/hr) hexene in a 3/16 inch (0.48 cm) stainless steel tube. The Catalyst B and hexene mixture were mixed with cocatalyst (MMAO-3A, 1 wt % Aluminum) in a line for about 15 minutes. 0.5 wt % Catalyst A in toluene solution was added to the activated Catalyst B solution for about 15 minutes before being sprayed into the reactor. The quantity of Catalyst A catalyst was about 65–70 mol % of the total solution fed. In addition to the solution, isopentane and nitrogen were added to control particle size. The total system was passed through the injection nozzle into the fluidized bed. MMAO to catalyst ratio was controlled so that the final Al:Zr molar ratio was 500. A bimodal polymer was produced which was 0.06 g/10 min melt index and 6.26 g/10 min flow index. The density was 0.9501 g/cc. A residual zirconium of 0.65 ppmw was calculated based on a reactor mass balance. SEC analysis and deconvolution using 7–8 floury distributions was completed and the results are shown in Table I.

TABLE I

| Example | 1 (Comp) | 2 (Comp) | 3 | 4 | 5 | 6 | 7 |
|---|---|---|---|---|---|---|---|
| $I_{21}$ (dg/min) | 0.28 | n/a | 7.5 | 7.94 | 12.6 | 38.1 | 6.26 |
| $I_{21}/I_2$ | — | — | 165.3 | 147 | 164.6 | 280.4 | 104 |
| $I_2$ (dg/min) | no flow | 797 | 0.045 | 0.054 | 0.077 | 0.136 | 0.060 |
| Experimental SEC Data | | | | | | | |
| Mn | 80,600 | 2,952 | 7,908 | 10,896 | 10,778 | 10,282 | 8,700 |
| Mw | 407,375 | 13,398 | 340,011 | 263,839 | 259,389 | 261,138 | 287,961 |
| Mw/Mn | 5.05 | 4.54 | 43 | 24.2 | 24.1 | 25.4 | 33.10 |
| Mn (calculated) | — | — | 7,645 | 10,552 | 10,673 | 10,105 | 8,523 |
| Mw (calculated) | — | — | 339,752 | 258,282 | 248,215 | 252,310 | 284,814 |
| Mw/Mn (calculated) | — | — | 44.44 | 24.48 | 23.26 | 24.97 | 33.42 |
| LMW Mn (calculated) | — | 2,988 | 3,741 | 5,548 | 5,731 | 6,382 | 4,165 |
| LMW Mw (calc.) | — | 13,214 | 13,259 | 16,388 | 15,214 | 18,333 | 11,771 |
| LMW Mw/Mn (calc.) | — | 4.42 | 3.54 | 2.95 | 2.65 | 2.87 | 2.83 |
| HMW Mn (calculated) | 73,979 | — | 122,758 | 111,256 | 85,461 | 88,374 | 115,954 |
| HMW Mw (calc.) | 407,513 | — | 633,154 | 501,013 | 484,657 | 607,625 | 526,630 |
| HMW Mw/Mn (calc.) | 5.51 | — | 5.16 | 4.50 | 5.67 | 6.88 | 4.54 |
| SPLIT (HMW/Total) | 100.00 | 0.00 | 52.67 | 49.92 | 49.64 | 39.70 | 53.03 |
| Reactor Conditions | | | | | | | |
| Reactor Temp (° C.) | 85 | 80 | 80 | 85 | 85 | 85 | 85 |
| $C_2$ psi/Mpa | 220/1.52 | 180/1.24 | 220/1.52 | 220/1.52 | 220/1.52 | 220/1.52 | 220/1.52 |
| $H_2/C_2$ mole ratio | 0.0016 | 0.0018 | 0.0013 | 0.0014 | 0.0014 | 0.0010 | 0.0019 |
| $C_6/C_2$ mole ratio | 0.00488 | 0.00153 | 0.0074 | 0.0073 | 0.0077 | 0.0075 | 0.0050 |
| Residence time (hr) | 3.6 | 7.5 | 5.3 | 4.74 | 3.87 | 3.87 | 3.4 |
| Molar ratio HMW/LMW | — | — | 0.71 | 0.73 | 0.76 | 0.76 | 2.16 |
| Molar % Catalyst A | 100 | — | 41 | 42 | 43 | 43 | 68 |
| Zr ppm, by lab | — | — | 1.33 | 1.61 | 1.33 | 0.8 | 0.97 |
| Zr ppm, by feed | 1.63 | — | 1.46 | 1.06 | 0.9 | 0.54 | 0.62 |
| Average | 1.63 | — | 1.40 | 1.34 | 1.12 | 0.67 | 0.80 |
| Al/Zr mole ratio | 400 | — | 330 | 380 | 320 | 307 | 500 |
| Catalyst B activity g PE/mmol cat-hr | — | — | 9,965 | 12,515 | 18,754 | 37,288 | 50,142 |
| Catalyst A activity g PE/mmol cat-hr | 15,559 | — | 15,730 | 17,042 | 24,323 | 32,465 | 26,203 |

Comparative Examples 1 and 2 give experimental data on how the single component catalyst system behave. Examples 3 and 4 demonstrate the effect of temperature on essentially the same reactor conditions and catalyst feed system. Note that at higher temperature, the $M_w/M_n$ is lower, as is the MFR. Examples 5 and 6 compare the effect of activation scheme for essentially the same reactor conditions and catalyst feed system. Note that in Example 6, the overall activity of the catalyst is better. However, the amount of high molecular weight material produced is lower. Examples 6 and 7 demonstrate the ability to control the amount of high molecular weight material produced at essentially similar reactor conditions. Example 7 fed a higher percentage of Catalyst A feed, hence a higher quantity of higher Mw material was produced.

Example 8

350 pounds (159 kg) of polyethylene produced according to example 4 above (referred to as Polymer A) was compounded on a Werner-Fleiderer ZSK-30 twin screw extruder with 1000 ppm Irganox™ 1076 and 1500 ppm Irgafos™ 1068 at a melt temperature of 220° C. and formed into pellets. Then the pellets were blown into a 0.5 mil (13 μm) film on an Alpine blown film extrusion line. The extrusion condition were: die-160 mm triplex, 1.5 mm die gap, 400° C. die temperature, 48 inches (122 cm) layflat width, target melt temperature—410° F. (210° C.), and extrusion rates—310 lb/hr (144 kg/hr), 420 lb/hr (191 kg/hr) and 460 lb/hr (209 kg/hr). ESCORENE™ HD7755.10 (a conventional series reactor product of Exxon Chemical Company, Houston, Tex.) was run at the same conditions as a comparison. All films were conditioned according to 23° C., 50% humidity for 40 hours. The data are reported in Table A.

Example 9

Several drums of granular samples (produced following the polymerization procedure above with a molar catalyst ratio (Catalyst A/Catlayst B) of 2.3 were tumble mixed with 1000 ppm Irganox™ 1076 and 1500 ppm Irgafos™ 1068 and 1500 ppm of calcium stearate. This tumble-mixed granluar resin was pelletized on a 2½" (6.35 cm) Prodex compounding line at 400° F. (204° C.). Thus prepared pellets were film extruded on a 50 mm Alpine blown film line which is equipped with an extruder with 50 mm single screw (18:1 L/D ratio) and 100 mm annular die with 1 mm die gap. The extrusion conditions were: 400° F. (204° C.) die temperature, output rate—100 lb/hr (46 kg/hr). A typical set temperature profile was: 380° F./400° F./400° F./400° F./400° F./400° F./410° F./410° F. (193° C./204° C./204° C./204° C./204° C./204° C./210° C./210° C.) for Barrel1/Barrel2/Block adaptor/Bottom adaptor/Verical adaptor/Die bottom/Die middle/Die top. The pellet samples were extruded to produce 1.0 mil (251 μm) film sample at the line speed of 92 fpm (48 cm/sec) and 0.5 mil (13 μm) film sample at the line speed of 184 fpm (94 cm/sec) at the blow-up ratio (BUR) of 4.0. For both cases the bubble showed excellent stability with a typical "necked-in" wine glass shape. The FLH (frost line height) of blown bubble was maintained at 36 inches (91.4 cm) and 40 inches (101.6 cm), respectively for 1.0 mil (25 μm) and 0.5 mil (12.5 μm) film. The extrusion head pressure and motor load exhibited slightly higher than ESCORENE™ HD7755.10 (a conventional series reactor product of Exxon Chemical Company in Mt Belvue Tex.) at the same extrusion conditions. The resultant film properties are reported in Table B. All the film samples were condi-

TABLE A

|  | Polymer A | HD7755.10 | Polymer A | HD7755.10 | Polymer A | HD7755.10 |
|---|---|---|---|---|---|---|
| Rate lb/hr/ (kg/hr) | 317 (144) | 317 (144) | 421 (191) | 421 (191) | 460 (209) | 460 (209) |
| Film Gage | 0.524 mil/ 13 μm | 0.502 mil/ 13 μm | 0.532 mil/ 14 μm | 0.519 mil/ 13 μm | 0.543 mil/ 14 μm | 0.528 mil/ 13 μm |
| Density g/cc | 0.9489 | 0.949 | 0.9502 | 0.949 | 0.9468 | 0.9489 |
| 26" (66 cm) dart @ 1 day | 355 g | 308 g | 327 g | 325 g | nm | nm |
| 26" (66 cm) dart @ 7 days | 351 g | 308 g | 314 g | 344 g | 301 g | 360 g |
| MD Tear g/mil (g/μ) | 22 (0.87) | 16 (0.63) | 25 (0.98) | 15 (0.59) | 22 (0.87) | 15 (0.59) |
| TD Tear g/mil (g/μ) | 97 (3.82) | 102 (4.02) | 77 (3.03) | 84 (3.31) | 100 (3.94) | 81 (3.19) |
| 1% Secant MD, psi (MPa) | 161,000 (1110) | 200,200 (1380) | 159,000 (1096) | 183,800 (1267) | 156,200 (1077) | 178,700 (1232) |
| 1% Secant TD, psi (MPa) | 184,500 (1272) | 212,500 (1465) | 163,500 (1127) | 206,600 (1425) | 161,400 (1113) | 212,500 (1465) |
| MD UT Str. psi (MPa) | 14445 (100) | 14347 (99) | 12574 (87) | 15110 (104) | 12934 (89) | 15609 (108) |
| TD UT Str. psi (MPa) | 13369 (92) | 12124 (84) | 10785 (74) | 12278 (85) | 11727 (81) | 11482 (79) |
| U Elong. % | 285 | 293 | 246 | 296 | 253 | 299 |
| U. Elon. % | 317 | 393 | 305 | 377 | 340 | 377 |
| Haze % | 59.6 | 64.0 | 57.8 | 62.0 | 56.9 | 60.9 |
| 45° Gloss | 13.6 | 10.8 | 13.4 | 12.0 | 14.9 | 11.9 |

MD = Machine Direction,
TD = Transverse Direction,
UT Str = Ultimate Tensile strength
U. Elong = Ultimate Elongation ESCORENE HD7755.10 is a polyethylene polymer available from Exxon Chemical Company, Houston, Tex., having an $I_{21}$ of 7.5, and MIR of 125, an $M_w$ of 180,000, a density of 0.95 g/cc, produced using a dual reactor system.

tioned at to 23° C., 50% humidity for 40 hours. Dart impact strength of 0.5 mil (12.5 μm) film exhibited 380 g, which exceeded that of ESCORENE™ HD7755.10 which showed 330 g.

TABLE B

| | Escorene ™ 7755 | | Polymer B | |
|---|---|---|---|---|
| $I_2$ (g/10 min) | 0.08 | | 0.062 | |
| $I_{21}$ (g/10 min) | 10 | | 10.02 | |
| $I_{21}/I_2$ | 134 | | 160.5 | |
| Density (g/cc) | 0.952 | | 0.9485 | |
| Output (lb/hr) (kg/hr) | 104 (47) | | 100 (47) | |
| Die rate (lb/hr/in die) | ~8 | | ~8 | |
| Head pressure psi/MPa | 7,200 (50) | | 7600 (53) | |
| Motor Load (amp) | 56 | | 61 | |
| BUR | 4 | | 4 | |
| FLH (inch)(cm) | 36 (91.4) | 40 (101.6) | 36 (91.4) | 40 (101.6) |
| melt fracture | no | no | no | no |
| Bubble Stability | good | good | good | good |
| Take-up (fpm)(m/s) | 92 (0.5) | 185 (0.9) | 92 (0.5) | 184 (0.9) |
| Film gauge (mil)($\mu$) | 1 (25) | 0.5 (12.5) | 1 (25) | 0.5 (12.5) |
| Dart Impact strength (g) | 250 | 330 | 290 | 360 |
| Tensile str. (psi)(MPa) | | | | |
| MD | 8,400 (58) | 11,300 (78) | 8100 (56) | 11400 (79) |
| TD | 7,900 (55) | 10,400 (72) | 7230 (50) | 9520 (66) |
| Elongation (%) | | | | |
| MD | 350 | 230 | 410 | 330 |
| TD | 570 | 390 | 580 | 410 |
| Elmendorf Tear (g/mil)(g/$\mu$) | | | | |
| MD | 25 (0.98) | 22 (0.87) | 24 (0.95) | 33 (1.30) |
| TD | 142 (5.59) | 72 (2.83) | 205 (8.07) | 71 (2.80) |
| Modulus (psi)(MPa) | | | | |
| MD | 127,000 (876) | 144,000 (993) | 131500 (907) | 135350 (933) |
| TD | 146,000 (1007) | 169,000 (1165) | 160250 (1105) | 156300 (1078) |

MD = machine direction,
TD = transverse direction.

Example 10

Following the procedure of Example 9, several drums of granular samples (Polymer C produced following the polymerization procedure above with a molar catalyst ratio of Catalyst A to Catalyst B of 0.732 and Polymer D produced following the polymerization procedure above with a molar catalyst ratio of Catalyst A to Catalyst B of 2.6) were tumble mixed with 1000 ppm Irganox™ 1076, 1500 ppm of calcium stearate and 1500 ppm Irgafos™ 1068 then pelletized and extruded as described in Example 9. All films were conditioned at 23° C. and 50% humidity for 40 hours. Dart impact strength of a 0.5 mil (12.5 um) film from both Polymer C and Polymer D exhibited 380 g, which exceeded that of ESCORENE™ HD 7755.10 which showed 330 g. The data are reported in Table C.

TABLE C

| Sample | Polymer C | | Polymer D | | Escorene 7755 | |
|---|---|---|---|---|---|---|
| Rxn Temp (° C.) | 85 | | 85 | | | |
| $C_2$ (psi)(kPa) | 220 (1517) | | 220 (1517) | | | |
| $H_2/C_2$ (molar) | 0.0014–0.0016 | | 0.00102 | | | |
| $C_6/C_2$ (molar) | 0.0075–0.0078 | | 0.00531–0.00586 | | | |
| Mn | 14,600 | | 16,400 | | | |
| Mw | 309,100 | | 298,200 | | 291,500 | |
| Mw/Mn | 21.2 | | 18.2 | | 15.7 | |
| HMW/LMW | 53.8/46.2 | | 50.5/49.5 | | | |
| $I_2$ (g/10 min) | 0.056 | | 0.049 | | 0.08 | |
| $I_{21}$ (g/10 min) | 6.48 | | 6.7 | | 10 | |
| MFR ($I_{21}/I_2$) | 115.8 | | 138 | | 134 | |
| Density (g/cc) | 0.9487 | | 0.9461 | | 0.952 | |
| Output (lb/hr)(kg/hr) | 102 (46) | | 102 (46) | | 100 (45) | |
| Die rate (lb/hr/in die) | ~8 | | ~8 | | 10 | |
| Head. (psi)(MPa) | 8,120 (56) | | 7,890 (54) | | 7,230 (50) | |
| Motor Load (amp) | 64.5 | | 63 | | 59 | |
| BUR | 4 | | 4 | | 4 | |
| FLH (inch)(cm) | 40 (101.6) | 40 (101.6) | 36 (91.4) | 40 (101.6) | 36(91.4) | 40 (101.6) |
| melt fracture | no | | no | | no | |
| Bubble Stability | Fair | Good | Good | Good | Good | Good |
| Filmgauge (mil)($\mu$m) | 1 (25.4) | 0.5 (12.7) | 1 (25.4) | 0.5 (12.7) | 1 (25.4) | 0.5 (12.7) |
| Dart Impact (g) | 200 | 380 | 200 | 380 | 250 | 330 |

TABLE C-continued

| Sample | Polymer C | | Polymer D | | Escorene 7755 | |
|---|---|---|---|---|---|---|
| Tensile strength | | | | | | |
| MD (psi)(MPa) | 10,300 | 19,900 | 9,900 | 15,500 | 8,400 | 11,300 |
| | (71) | (137) | (68) | (107) | (58) | (78) |
| TD (psi)(MPa) | 7,900 | 13,800 | 8,400 | 14,500 | 7,900 | 10,400 |
| | (55) | (95) | (58) | (100) | (55) | (72) |
| Elongation (%) | | | | | | |
| MD | 320 | 240 | 290 | 250 | 350 | 230 |
| TD | 630 | 385 | 610 | 350 | 570 | 390 |
| Elmendorf Tear | | | | | | |
| MD (g/mil)(g/μm) | 24 (0.95) | 21 (0.83) | 36 (1.42) | 36 (1.42) | 25 (0.98) | 22 (0.87) |
| TD (g/mil)(g/μm) | 410 (16.1) | 87 (3.4) | 350 (13.8) | 66 (2.6) | 142 (5.6) | 72 (2.8) |
| Modulus | | | | | | |
| MD (kpsi)(MPa) | 105 (724) | 120 (827) | 103 (710) | 110 (758) | 127 (876) | 144 (993) |
| TD (psi)(MPa) | 128 (883) | 126 (869) | 129 (889) | 114 (786) | 146 (1007) | 169 (1165) |

Alpine line, 2" screw, 4 inch (10.2 cm) die, 40 mil (1016 μm) die gap, 410° F. (210° C.) die set Temp.

In addition to the examples above, other variations on polymerizing using the catalyst systems described herein include:

1. Compound I could be dissolved in a solvent, preferably toluene to form the desired weight % solution then used in combination with other catalyst systems.

2. Catalyst A could be used as a 0.50 weight % solution in toluene and Catalyst B could be used as a 0.25 weight % solution in hexane at molar ratios of B to A of about 0.7 when the two are activated separately then mixed together (parallel activation) or at molar ratios of B to A of 2.2 to 1.5 when A is activated then B is added (sequential activation).

3. Raising or lowering the reaction temperature to narrow or broaden the Mw/Mn, respectively.

4. Changing residence time to affect product properties. Large changes can have significant impact. One to five, preferably four hours residence time appears to produce good product properties.

5. Spraying the catalyst into the reactor in such a way as to create a particle lean zone. A particle lean zone can be created by a 50,000 lb/hr flow of cycle gas through 6 inch pipe. The catalyst can be atomized w/a spray nozzle using nitrogen atomizing gas.

6. The activator, preferably MMAO 3A can be used at 7 weight % al in isopentane, hexane or heptane at feed rate sufficient to give an Al/Zr ratio of 100 to 300.

7. Catalyst A is mixed on-line with MMAO 3A then Catalyst B is added on line, then the mixture is introduced into the reactor.

8. Catalyst A is mixed on-line with MMAO 3A and Catalyst B is mixed on line with MMAO 3A thereafter the two activated catalysts are mixed on-line then introduced into the reactor.

All documents described herein are incorporated by reference herein, including any priority documents and/or testing procedures. As is apparent form the foregoing general description and the specific embodiments, while forms of the invention have been illustrated and described, various modifications can be made without departing from the spirit and scope of the invention. It is within the scope of this invention to use two or more Group 15 containing metal compounds with one or more bulky ligand metallocene-type catalyst system and/or one or more conventional type catalyst system. Accordingly it is not intended that the invention be limited thereby.

We claim:

1. A process of polymerizing olefin(s) to produce a polyolefin comprising contacting in a gas phase reactor olefins and catalyst composition comprising at least one activator, a Group 15 containing metal compound and a bulky ligand metallocene catalyst compound comprising zirconium, at a reaction temperature of from 30° C. to 120° C.; wherein raising or lowering the reaction temperature narrows or broadens the Mw/Mn of the polyolefin, respectively; and wherein the Group 15 containing metal compound is represented by the formula:

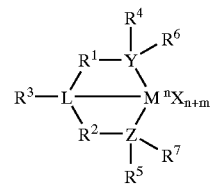

wherein M is zirconium;

each X is independently a leaving group;

n is the oxidation state of M;

m is the formal charge of the ligand comprising the YZL group;

L, Y, and Z are each nitrogen atoms;

$R^1$ and $R^2$ are independently a $C_1$ to $C_{20}$ hydrocarbon group, or a heteroatom containing group having up to twenty carbon atoms wherein $R^1$ and $R^2$ may be interconnected directly to each other;

$R^3$ is absent or a hydrocarbon group, hydrogen, a halogen, or a heteroatom containing group;

$R^4$ and $R^5$ are represented by the formula

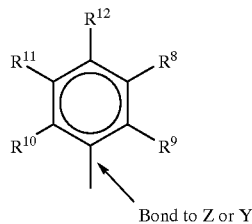

Bond to Z or Y wherein $R^8$ to $R^{12}$ are each independently hydrogen, a $C_1$ to $C_{40}$ alkyl group, a halide, a heteroatom, or a heteroatom containing group containing up to 40 carbon atoms; and $R^6$ and $R^7$ are independently absent, or are hydrogen, an alkyl group, a halogen, a heteroatom or a hydrocarbyl group.

2. The process of claim 1, wherein the polyolefin is produced in a single reactor.

3. The process of claim 1, wherein $R^8$ to $R^{12}$ are each independently a $C_1$ to $C_{20}$ linear or branched alkyl group, wherein any two $R^8$ to $R^{12}$ groups may form a cyclic group or a heterocyclic group, and wherein the cyclic group may be aromatic.

4. The process of claim 1, wherein the properties of the polyolefin are controlled by changing the amount of bulky ligand metallocene catalyst compound combined.

5. The process of claim 1, wherein the catalyst composition is supported.

6. The process of claim 1, wherein the catalyst composition is introduced into the reactor as an alkane solution, suspension or emulsion.

7. The process of claim 1, wherein the bulky ligand metallocene catalyst compound comprises at least one fluoride or fluorine containing leaving group.

8. The process of claim 1, wherein the olefins are ethylene and at least one olefin comonomer selected from the group consisting of olefins having from 4 to 12 carbon atoms.

9. The process of claim 8, wherein a polyethylene copolymer is isolated having a bimodal molecular weight distribution; and wherein the Mw/Mn value of the copolymer ranges from 20 to 40.

10. The process of claim 9, wherein the copolymer comprises a higher molecular weight component and a lower molecular weight component; wherein the weight average molecular weight $M_w$ of the high molecular weight component of the copolymer is above 150,000 a.m.u.

11. The process of claim 10, wherein the weight average molecular weight $M_w$ of the high molecular weight component of the copolymer is above 250,000 a.m.u.

12. The process of claim 8, wherein a polyethylene copolymer is isolated having a density in the range of from 0.940 to 0.947 g/cm$^3$.

13. The process of claim 8, wherein a polyethylene copolymer is isolated having a $I_{21}/I_2$ value of 80 or more.

14. The process of claim 8, wherein a polyethylene copolymer is isolated having a $I_2$ between 0.01 and 10 dg/min.

15. The process of claim 8, wherein a polyethylene copolymer is isolated having an extrusion rate of greater than about 17 lbs/hour/inch of die circumference.

16. The process of claim 8, wherein the polyethylene copolymer is formed into a film or a pipe.

17. The process of claim 8, wherein the $C_x/C_2$ mole ratio, where $C_x$ is the amount of comonomer and $C_2$ is the amount of ethylene, is between about 0.001 to 0.010.

18. The process of claim 1, wherein the Group 15 containing catalyst compound and the bulky ligand metallocene catalyst compound are combined at molar ratios of from 10:90 to 90:10.

* * * * *